(12) United States Patent
Yamagishi

(10) Patent No.: US 6,631,432 B1
(45) Date of Patent: Oct. 7, 2003

(54) INFORMATION PROCESSING SYSTEM, CONTROL METHOD THEREFOR, AND INFORMATION PROCESSING APPARATUS

(75) Inventor: Yoichi Yamagishi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/466,902

(22) Filed: Dec. 20, 1999

(30) Foreign Application Priority Data

Dec. 24, 1998 (JP) ............................................ 10-368169

(51) Int. Cl.⁷ .............................................. G06F 13/36
(52) U.S. Cl. ...................... 710/107; 710/107; 710/300; 710/307; 710/315
(58) Field of Search ................................ 710/300, 107, 710/307, 315

(56) References Cited

U.S. PATENT DOCUMENTS

| | | | |
|---|---|---|---|
| 5,535,208 A | 7/1996 | Kawakami et al. ............ 370/84 |
| 5,978,876 A | * 11/1999 | Greaves ....................... 710/107 |
| 6,128,659 A | * 10/2000 | Subblah et al. .............. 709/225 |
| 6,230,219 B1 | * 5/2001 | Fields, Jr. et al. ............ 710/22 |
| 6,233,637 B1 | * 5/2001 | Smyers et al. ............... 710/129 |
| 6,366,964 B1 | * 4/2002 | Shima et al. ................... 710/8 |

FOREIGN PATENT DOCUMENTS

| | | |
|---|---|---|
| JP | 7-264219 | 10/1995 |
| JP | 8-8913 | 1/1996 |
| JP | 10-303943 | 11/1998 |
| JP | 2000-115198 | 4/2000 |

OTHER PUBLICATIONS

Office Action, dated Mar. 7, 2003, in JP 10–368169.
Office Action, dated Dec. 13, 2002, in JP 10–368169.

* cited by examiner

*Primary Examiner*—Jeffrey Gaffin
*Assistant Examiner*—Mohammad O. Farooq
(74) *Attorney, Agent, or Firm*—Fitzpatrick, Cella, Harper & Scinto

(57) ABSTRACT

An information processing system, which has a computer, scanning apparatus, and printing apparatus using an IEEE 1394 bus as a communication interface, searches for an available channel in order to assign a predetermined number of channels to an apparatus having operation priority. When no available channel is found by the search, the system determines whether any of channels allocated by an other apparatus can be reassigned to the high-priority apparatus. If any channels are determined to be reassignable, the system reassigns the channels to the high-priority apparatus. This makes it possible to flexibly assign channels in an isochronous transfer serial bus and transfer information desired by the user.

14 Claims, 21 Drawing Sheets

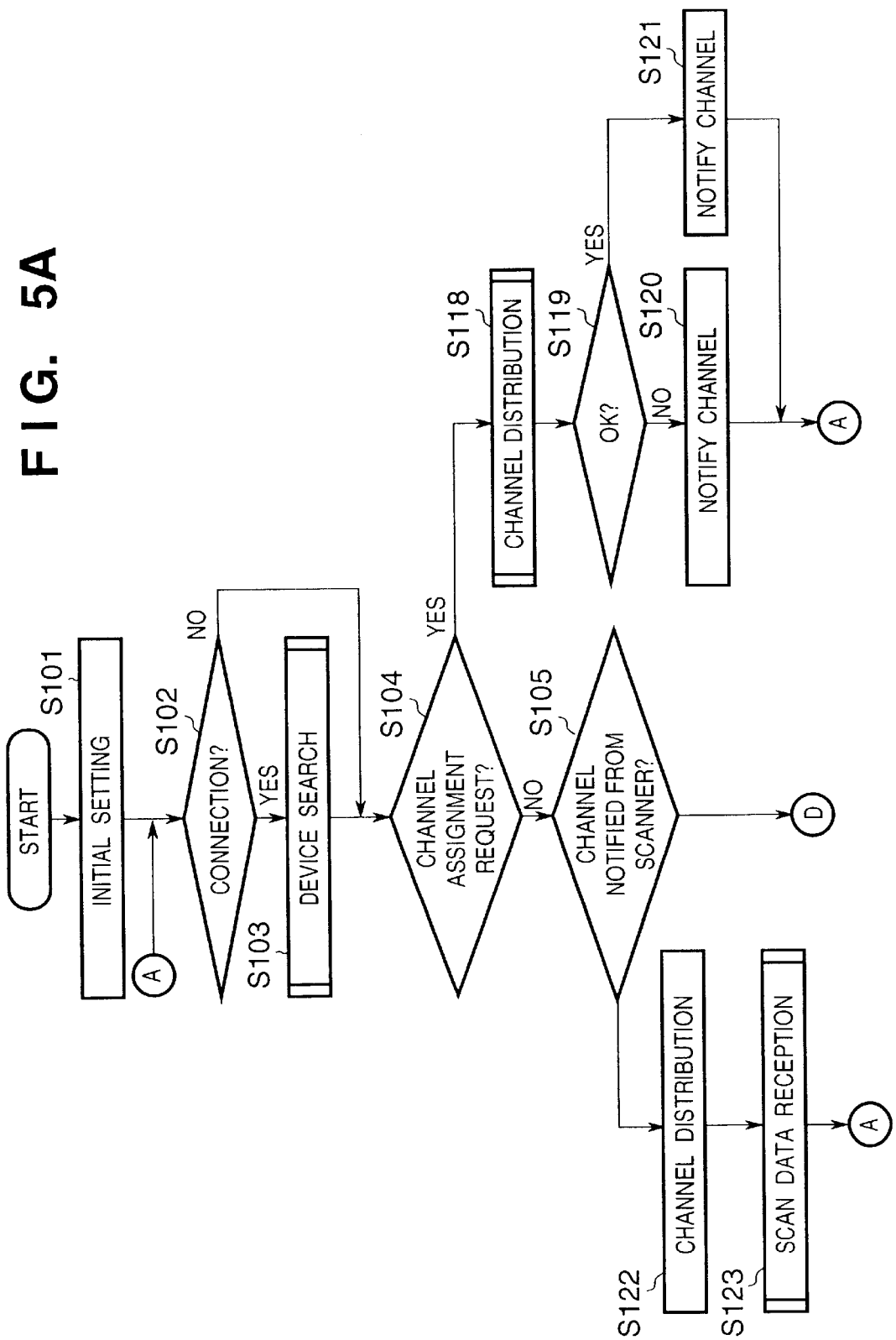

FIG. 17

| PRIORITY | SCANNER | PRINTER |
|---|---|---|
| SCANNER PRIORITY | NORMAL OPERATION | WAIT |
| . | . | . |
| . | . | . |
| . | . | . |
| PRINTER PRIORITY | WAIT | NORMAL OPERATION |

FIG. 18

| DEVICE | NUMBER OF CHANNELS ACQUIRED |
|---|---|
| SCANNER B | 3 |
| HOST C | 4 |
| PRINTER A | 0 |
| PRINTER B | 1 |
| . | . |
| . | . |

INFORMATION PROCESSING SYSTEM, CONTROL METHOD THEREFOR, AND INFORMATION PROCESSING APPARATUS

BACKGROUND OF THE INVENTION

1. Field of the Invention

The present invention relates to an information processing system including an isochronous transfer serial bus capable of transmitting a plurality of types of packets discriminated by channels, and at least two information processing apparatuses each of which uses the isochronous transfer serial bus as a communication interface and can receive packets of channels assigned to itself, a control method for the information processing system, and an information processing apparatus.

2. Description of the Related Art

Recently, high-speed serial communication interfaces having a function of ensuring a given data transfer rate using a transfer mode such as an isochronous transfer mode (to be referred to as an Iso transfer mode), are receiving a great deal of attention as isochronous transfer serial buses. Known examples of such interface having the Iso transfer mode to transfer data in real time at a high speed are the USB bus and IEEE 1394 bus.

In the Iso transfer mode, each information processing apparatus connected to a bus can be allocated at every prescribed cycle time a necessary number of channels capable of transferring data. This can realize an information processing system for transferring data from a scanning apparatus such as a scanner to a computer or from a computer to a printing apparatus such as a printer, while conforming to a predetermined data transfer rate corresponding to the performance of the apparatus.

In the prior art, however, the number of channels capable of transferring data without fail every prescribed cycle time is limited. If a given apparatus has been allocated channels, another apparatus may not be able to allocate a necessary number of channels simultaneously.

SUMMARY OF THE INVENTION

The present invention has been made to overcome the conventional drawbacks, and has as its object to provide an information processing system capable of flexibly assigning channels in an isochronous transfer serial bus to transfer information desired by the user, a control method for the information processing system, and an information processing apparatus.

To achieve the above object, according to the present invention, there is provided an information processing system comprising an isochronous transfer serial bus capable of transmitting a plurality of types of packets discriminated by channels, and at least two information processing apparatuses each of which uses the isochronous transfer serial bus as a communication interface and can receive packets of channels assigned thereto, wherein either one of the information processing apparatuses has channel management means capable of modifying allocation of the channels in accordance with predetermined priority.

When the information processing apparatus which has been allocated channels has low priority, the channel management means preferably assigns the channels allocated by the information processing apparatus to an other information processing apparatus having high priority.

The channel management means preferably stores channel information assigned to each of the information processing apparatuses.

The priority is preferably determined by inputting an operation mode corresponding to which of the information processing apparatuses has operation priority.

The information processing apparatuses preferably include a scanning apparatus and/or printing apparatus.

The channel management means preferably modifies allocation of the channels in accordance with an inquiry from at least one of the information processing apparatuses.

According to the present invention, there is provided an information processing apparatuses which uses, as a communication interface with another apparatus, an isochronous transfer serial bus capable of transmitting a plurality of types of packets discriminated by channels, and can receive packets of channels assigned thereto, comprising channel management means capable of modifying allocation of the channels in accordance with predetermined priority.

According to the present invention, there is provided a control method for an information processing system having an isochronous transfer serial bus capable of transmitting a plurality of types of packets discriminated by channels, and at least two information processing apparatuses each of which uses the isochronous transfer serial bus as a communication interface and can receive packets of channels assigned thereto, comprising a channel management step for modifying allocation of the channels in accordance with predetermined priority, and a communication step for performing communication in accordance with allocation of the channels modified in the channel management step.

The channel management step preferably comprises modifying allocation of the channels in accordance with an inquiry from at least one of the information processing apparatuses.

The channel management step preferably comprises a search step for searching for an available channel in order to allocate the number of channels necessary for a first information processing apparatus of the information processing apparatuses, a determination step for determining whether any of channels allocated by a second information processing apparatus can be assigned to the first information processing apparatus when no available channel is searched in the search step, and a channel reallocation step for reassigning at least some of the channels allocated by the second information processing apparatus to the first information processing apparatus when channels assignable to the first information processing apparatus are determined in the determination step to exist in the channels allocated by the second information processing apparatus.

According to the present invention, there is provided a computer-readable memory which stores a control program for an information processing system having an isochronous transfer serial bus capable of transmitting a plurality of types of packets discriminated by channels, and at least two information processing apparatuses each of which uses the isochronous transfer serial bus as a communication interface and can receive packets of channels assigned thereto, storing a code of the channel management program for modifying allocation of the channels in accordance with predetermined priority, and a code of the communication program for performing communication in accordance with allocation of the channels modified by the channel management program.

The channel management program comprises a search program for searching for an available channel in order to allocate the number of channels necessary for a first information processing apparatus of the information processing apparatuses, a determination program for determining whether or not any of channels allocated by a second information processing apparatus can be assigned to the first information processing apparatus when no available channel is searched by the search program, and a channel reallocation program for reassigning at least some of the channels allocated by the second information processing apparatus to the first information processing apparatus when channels assignable to the first information processing apparatus are determined by the determination program to exist in the channels allocated by the second information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B are flow charts showing the main routine of the computer;

FIG. 17 is a table showing an example of an operation mode correspondence table;

FIG. 18 is a table showing an example of a channel allocation table;

DETAILED DESCRIPTION OF THE PREFERRED EMBODIMENTS

Preferred embodiments of the present invention will be described in detail below with reference to the accompanying drawings. The relative arrangements, formulas, numerical values, and the like of building components described in this embodiment do not limit the spirit and scope of the present invention, unless otherwise specified.

A Preferred Embodiment

A preferred embodiment of the present invention will be explained with reference to the accompanying drawings.

Figure 1:
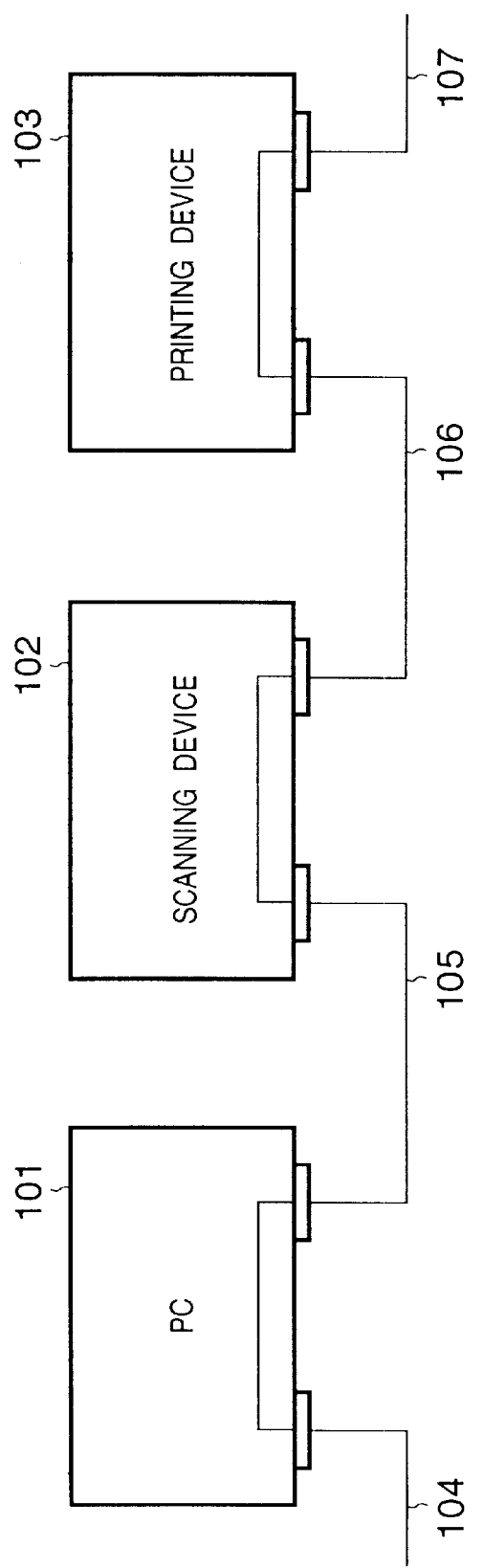
FIG. 1 is a block diagram showing an information processing system as an embodiment of the present invention.

FIG. 1 is a block diagram showing an arrangement of a system as the embodiment.

Reference numeral 101 denotes a computer which is normally used by a user and connected to a scanning device 102 via a high-speed serial communication I/F cable 105 and to a printing device 103 via a high-speed serial communication I/F cable 106. If necessary, the computer 101 is connected to another device (not shown) via a high-speed serial communication I/F cable 104, whereas the printing device 103 is connected to still another device (not shown) via a high-speed serial communication I/F cable 107.

The printing device 103 has a printing function. In printing a document or image created by the computer 101, the printing device 103 receives image printing data from the computer 101 via the high-speed serial communication I/F cables 105 and 106, performs necessary image processing, and then prints the image.

The high-speed serial communication I/F cables 104, 105, 106, and 107 are communication I/Fs having a mechanism of ensuring a data transfer rate such as the Iso transfer mode of a USB bus or IEEE 1394 bus. In general, these I/F cables 104, 105, 106, and 107 have a high-speed serial bus structure.

Arrangement of Computer

Figure 2:
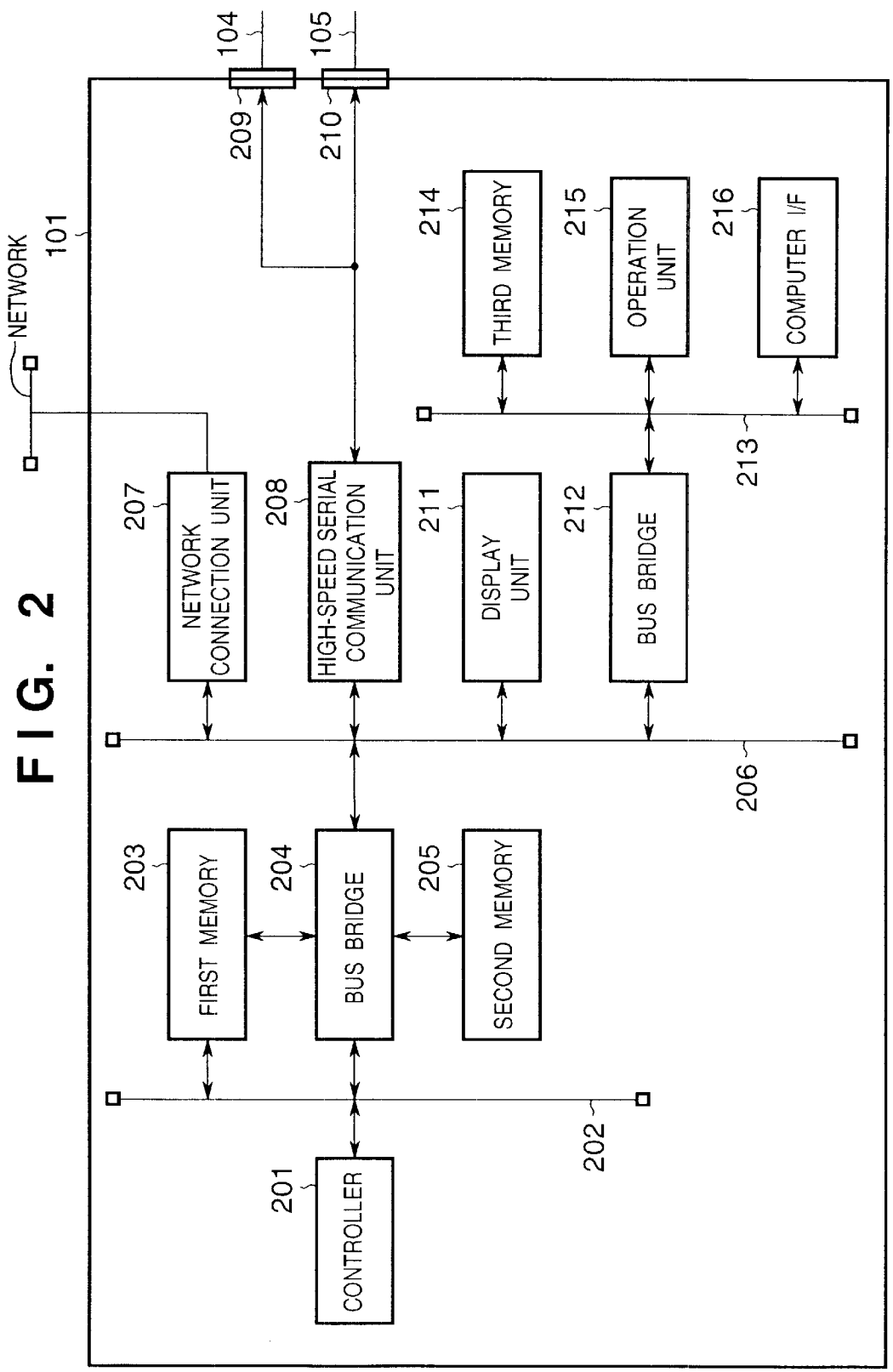
FIG. 2 is a block diagram showing an arrangement of a computer included in the information processing system as the embodiment of the present invention.

The computer 101 will be explained with reference to FIG. 2.

Reference numeral 201 denotes a controller for controlling the entire computer.

Reference numeral 202 denotes a CPU bus which connects the controller 201, a first memory 203, and a bus bridge 204, and transfers data processed by the controller 201 at a high speed.

The first memory 203 serves as a cache memory for operating the controller 201. The first memory 203 can be accessed by the controller 201 at a high speed, and temporarily stores data used for calculation by the controller 201. Generally, the first memory 203 is formed by a high-speed SRAM or the like.

The bus bridge 204 connects the CPU bus 202 to a high-speed bus 206 (to be described below), and absorbs any difference in processing speed between them. Through this bus bridge 204, the controller 201 can exchange data with respective units connected to the high-speed bus 206. The bus bridge 204 has a memory controller function, and controls a series of memory management operations, i.e., operations of reading out, at predetermined time intervals, data temporarily written in the first memory 203 by the controller 201 at a high speed, writing the readout data in a second memory 205, and writing the data read out from the second memory 205 in the first memory 203 in accordance with a request from the controller 201.

The second memory 205 serves as a main memory for executing various applications and the like by the controller 201. In general, the second memory 205 is a DRAM or the like.

The high-speed bus 206 connects the bus bridge 204, a network connection unit 207, a high-speed serial communication unit 208, a display unit 211, and a bus bridge 212. The high-speed bus 206 transfers data processed by the controller 201 to the respective units, and transfers (DMA transfer) data between the respective units at a high speed. In general, the high-speed bus 206 is a PCI bus or the like.

The network connection unit 207 connects the computer 101 to a network, and allows exchanging data with the network. The connected network is generally an Ethernet, token ring, or the like.

The high-speed serial communication unit 208 has a mechanism of ensuring the Iso transfer mode, i.e., data transfer rate, and can exchange a large amount of image data at a high speed within a predetermined time. In the Iso transfer mode, a channel for which a data transfer period is guaranteed is allocated, and data packets are broadcasted using this channel. The data transfer rate can be increased by ensuring a necessary number of channels.

The high-speed serial communication unit 208 further comprises a mechanism of performing one-to-one asynchronous transfer (to be referred to as an Async transfer mode) such as an asynchronous transfer mode, and can perform predetermined communication with the scanning device 102 and printing device 103 on request. Data is transferred using packets.

In general, the high-speed serial communication unit 208 is usually an IEEE 1394 bus or the like. Reference numerals 209 and 210 denote high-speed serial communication connectors for connecting the computer 101 to the printing device 103 via the high-speed serial communication I/F cable 105.

The display unit 211 is made up of a liquid crystal display unit, speaker, and the like, and displays or outputs necessary characters, images, speech, or the like in accordance with a program executed by the controller 201.

The bus bridge 212 connects the high-speed bus 206 to a low-speed bus 213 (to be described below), and absorbs any difference in processing speed between them. Through this bus bridge 212, each high-speed operation unit can exchange data with a low-speed operation unit connected to the low-speed bus 213.

The low-speed bus 213 connects the bus bridge 212, a third memory 214, an operation unit 215, and a computer interface 216. The low-speed bus 213 is lower in transfer rate than the high-speed bus 206, and connects a unit having lower performance. In general, the low-speed bus 213 is an ISA bus or the like.

The third memory 214 stores a plurality of applications used to operate the controller 201. In general, the third memory 214 is a large-capacity hard disk, and is managed by the controller 201.

The operation unit 215 is made up of a keyboard, microphone, and the like. The operation unit 215 allows inputting various settings necessary for the operation of the computer 101 and/or inputting various operation instructions to the controller 201.

The low-speed computer interface 216 connects the computer 101 to a peripheral device. In general, the low-speed computer interface 216 is formed from an RS-232C interface for serial communication, centronics interface for parallel communication, or the like.

Arrangement of Scanning Device

Figure 3:
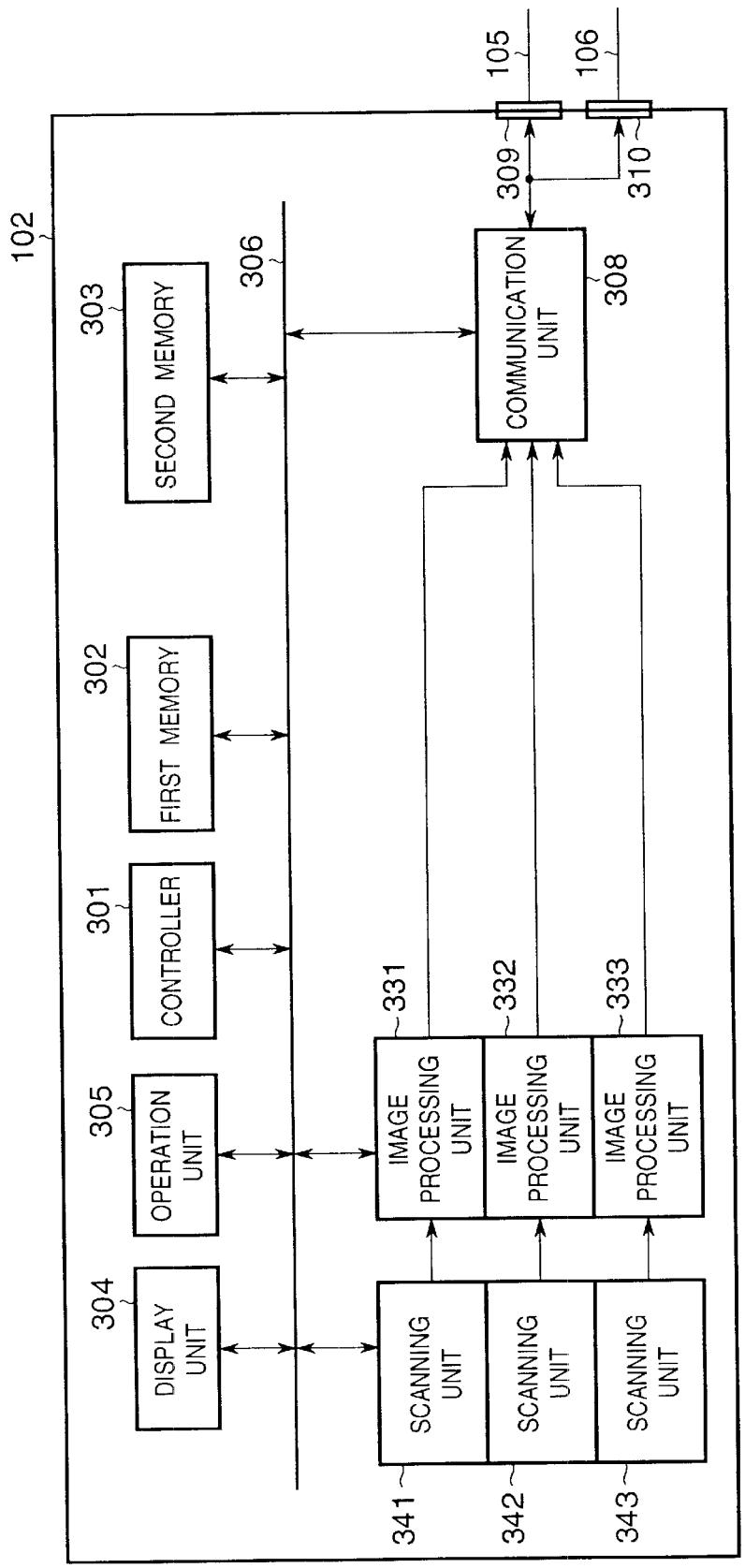
FIG. 3 is a block diagram showing an arrangement of a scanning device included in the information processing system as the embodiment of the present invention.

The scanning device 102 will be explained with reference to FIG. 3.

Reference numeral 301 denotes a controller which controls the whole scanning device and is operated by a real-time OS.

Reference numeral 302 denotes a first memory serving as a work memory used to operate the controller 301. The first memory 302 can be accessed by the controller 301 at a high speed.

Reference numeral 303 denotes a second memory for storing a plurality of applications used to operate the controller 301. The second memory 303 generally uses a large-capacity hard disk, and is managed by the controller 301.

Reference numeral 304 denotes a display unit; and 305, an operation unit. The display unit 304 comprises a liquid crystal display unit, and the operation unit 305 comprises a plurality of keys and a touch panel input device adhered to the liquid crystal unit. A signal input from the touch panel or key is transmitted to the controller 301 via a CPU bus 306, and the liquid crystal display unit displays image data which is read out and transferred from the first or second memory by the controller 301. The liquid display unit displays functions, image data, and the like in the operation of the printing device.

The operation unit 305 can be further equipped with input functions such as a digitizer or coordinate recognizer for a pen input, a microphone or speech recognizer for a speech input, and an image sensing device or image recognizer for an image input.

The CPU bus 306 connects the controller 301, first memory 302, second memory 303, and respective function units. The CPU bus 306 transfers data processed by the controller 301 to the respective function units, and transfers (DMA transfer) data between the respective function units at a high speed.

Reference numeral 308 denotes a high-speed serial communication unit which has a mechanism of ensuring a data transfer rate such as the Iso transfer mode, and can exchange a large amount of image data at a high speed within a predetermined time. In the Iso transfer mode, a channel for which a data transfer period is guaranteed is allocated, and data packets are broadcasted using this channel. The data transfer rate can be increased by ensuring a necessary number of channels.

The high-speed serial communication unit 308 further comprises a mechanism of performing the Async transfer mode, and can perform predetermined communication with the computer 101 and printing device 103 on request. Data is transferred using packets.

In general, the high-speed serial communication unit 308 is formed from an IEEE 1394 bus or the like.

Reference numerals 309 and 310 denote high-speed serial communication connectors respectively for connecting the scanning device 102 to the computer 101 via the high-speed serial communication I/F cable 105 and connecting the scanning device 102 to the printing device 103 via the high-speed serial communication I/F cable 106.

Reference numerals 331, 332, and 333 denote image processing units. These units 331, 332, and 333 execute various image processes such as shading correction processing, smoothing processing, edge processing, and color correction for image data of respective colors received from scanning units 341, 342, and 343 in accordance with processing instructions from the controller 301. Then, the units 331, 332, and 333 output the processed image data via the high-speed serial communication unit 308.

The scanning units 341, 342, and 343 use image sensors such as CCDs. The scanning units 341, 342, and 343 convert scanned image signals into image data in units of respective colors, and output the image data to the image processing units 331, 332, and 333.

The mechanism of the scanning device will be described with reference to FIG. 19.

An original feeder 11 of the scanning device 102 feeds originals to an original glass table 12 one by one from the last page, and after an original is scanned, discharges the originals.

When an original is fed to the original glass table 12, the internal lamp of a scanner 13 is turned on, and the scanner 13 starts moving to scan and expose the original.

Light reflected by the original is guided to an image sensor 16 by a plurality of mirrors 14 and a lens 15. The image of the scanned original is sensed by the image sensor 16.

Image data output from the image sensor 16 undergoes predetermined processing, and is transferred to a scanner I/F (not shown; a video I/F or high-speed serial communication I/F).

Arrangement of Printing Device

Figure 4:
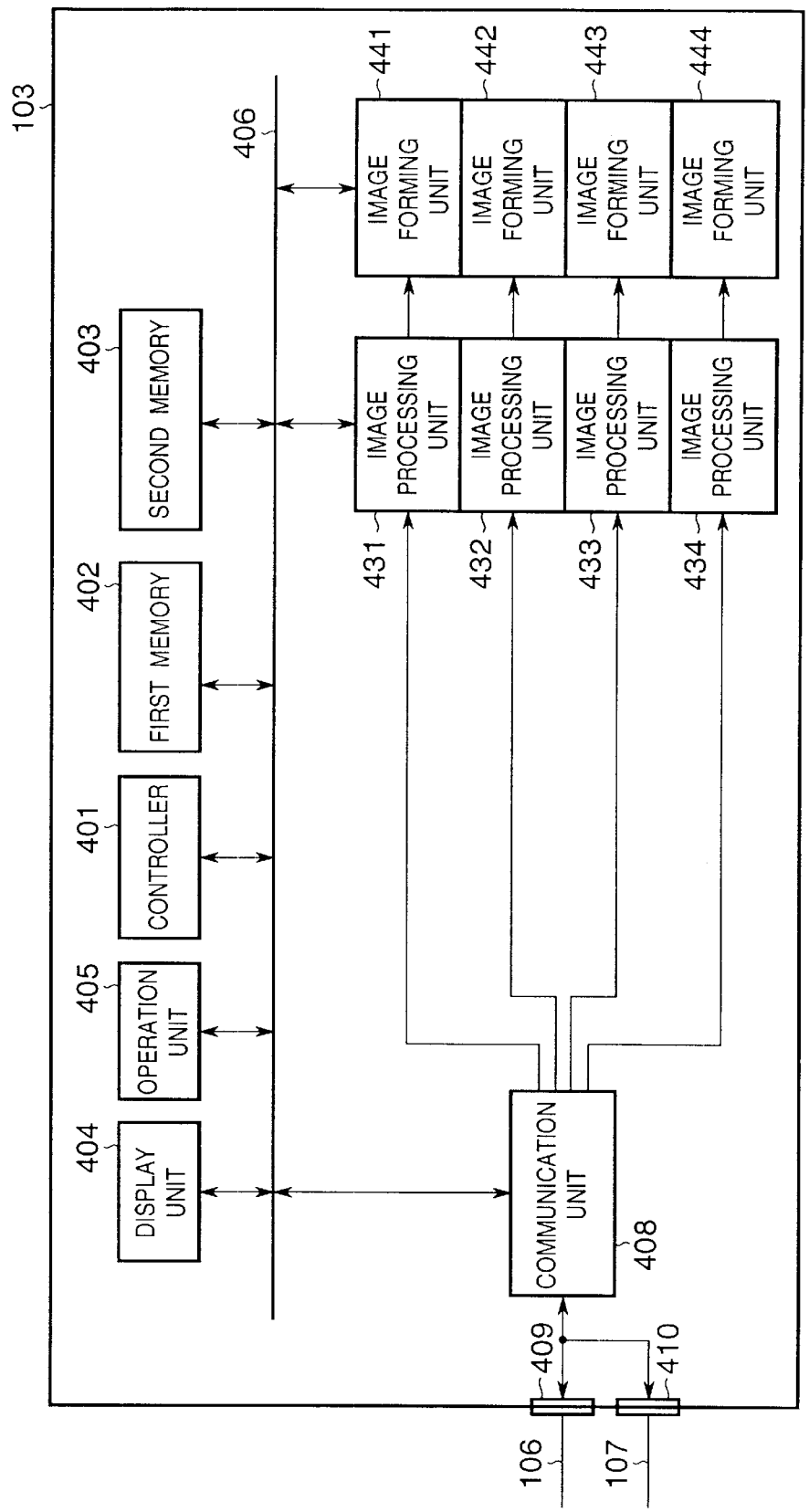
FIG. 4 is a block diagram showing an arrangement of a printing device included in the information processing system as the embodiment of the present invention.

The printing device 103 will be explained with reference to FIG. 4.

Reference numeral 401 denotes a controller which controls the entire printing device and is operated by a real-time OS.

Reference numeral 402 denotes a first memory serving as a work memory used to operate the controller 401. The first memory 402 can be accessed by the controller 401 at a high speed.

Reference numeral 403 denotes a second memory for storing a plurality of applications used to operate the controller 401. The second memory 403 is generally formed from a large-capacity hard disk, and is managed by the controller 401.

Reference numeral 404 denotes a display unit; and 405, an operation unit. The display unit 404 comprises a liquid crystal display unit, and the operation unit 405 comprises a plurality of keys and a touch panel input device adhered to the liquid crystal unit. A signal input from the touch panel or key is transmitted to the controller 401 via a CPU bus 406, and the liquid crystal display unit displays image data which is read out and transferred from the first or second memory by the controller 401. The liquid display unit displays functions, image data, and the like in the operation of the printing device.

The operation unit 405 can be further equipped with input functions such as a digitizer or coordinate recognizer for a pen input, a microphone or speech recognizer for a speech input, and an image sensing device or image recognizer for an image input.

The CPU bus 406 connects the controller 401, first memory 402, second memory 403, and respective function units. The CPU bus 406 transfers data processed by the controller 401 to the respective function units, and transfers (DMA transfer) data between the respective function units at a high speed.

Reference numeral 408 denotes a high-speed serial communication unit which has a mechanism of ensuring a data transfer rate such as used by the Iso transfer mode, and can exchange a large amount of image data at a high speed within a predetermined time. In the Iso transfer mode, a channel for which a data transfer period is guaranteed is allocated, and data packets are broadcasted using this channel. The data transfer rate can be increased by ensuring a necessary number of channels.

The high-speed serial communication unit 408 further comprises a mechanism for performing the Async transfer mode, and can perform predetermined communication with the computer 101 on request. Data is transferred using packets.

In general, the high-speed serial communication unit 408 is formed from an IEEE 1394 bus or the like.

Reference numerals 409 and 410 denote high-speed serial communication connectors for connecting the printing device 103 to the scanning device 102 via the high-speed serial communication I/F cable 106.

Reference numerals 431, 432, 433, and 434 denote image processing units. These units 431, 432, 433, and 434 execute various image processes such as smoothing processing, edge processing, and color correction for image data of respective colors input from the high-speed serial communication unit 408 in accordance with instructions from the controller 401.

Reference numerals 441, 442, 443, and 444 denote printing units for printing received image data as visible image data on a print sheet in units of respective colors. The printing units use, e.g., electrophotography in which a latent image is formed on a photosensitive drum using a laser beam or LED beam and the image is printed on a print sheet.

The mechanism of the printing device will be described with reference to FIG. 20.

The printing device 103 causes light-emitting elements 21, 22, 23, and 24 to emit laser beams or LED beams in accordance with image data of respective colors input from a printer I/F (not shown; formed from a video I/F or high-speed serial communication I/F).

These laser beams or LED beams respectively irradiate photosensitive drums 29, 30, 31, and 32 to form latent images corresponding to them on the photosensitive drums 29, 30, 31, and 32.

Developing agents are attached to the latent image portions of the photosensitive drums 29, 30, 31, and 32 by developing units 25, 26, 27, and 28.

At the timing synchronized with the irradiation start timing of the laser beams or LED beams, a print sheet is fed from either a sheet cassette 41 or 42. The print sheet is sequentially conveyed to transfer units 33, 34, 35, and 36 by a convey belt 43, and the developing agents attached to the photosensitive drums 29, 30, 31, and 32 are transferred to the print sheet.

The print sheet having the developing agents is conveyed to a fixing unit 37 where the developing agents are fixed to the print sheet by the heat and pressure of the fixing unit 37.

The print sheet having passed through the fixing unit 37 is discharged by discharge rollers 38. A sorter 53 stores discharged print sheets in respective bins to sort the sheets.

When double-sided printing is set, a print sheet having passed through the fixing unit 37 is temporarily conveyed to a convey switch 39, and then the rotational direction of the feed roller is reversed to guide the print sheet from the convey switch 39 to a refeed convey path 40.

When multiple printing is set, a print sheet is not conveyed to the discharge rollers 38 but guided to the refeed convey path 40.

The print sheet guided to the refeed convey path 40 is fed at the above-described timing, and sequentially conveyed to the transfer units 33, 34, 35, and 36 by the convey belt 43.

Figure 19:
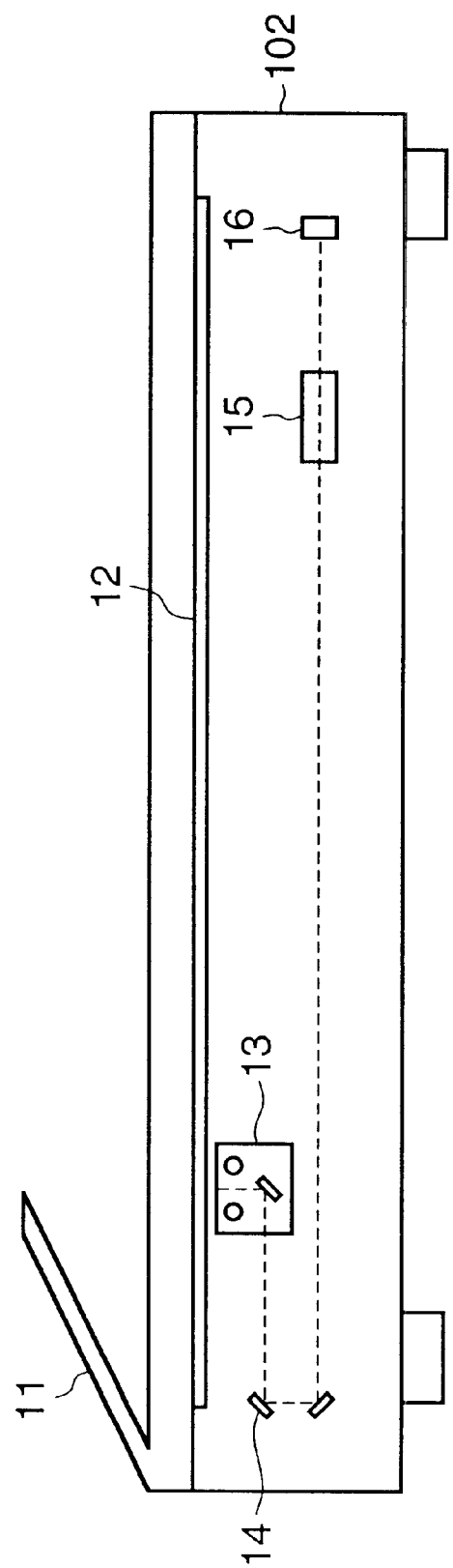
FIG. 19 is an explanatory sectional view showing the mechanical structure of the scanning device.
Figure 20:
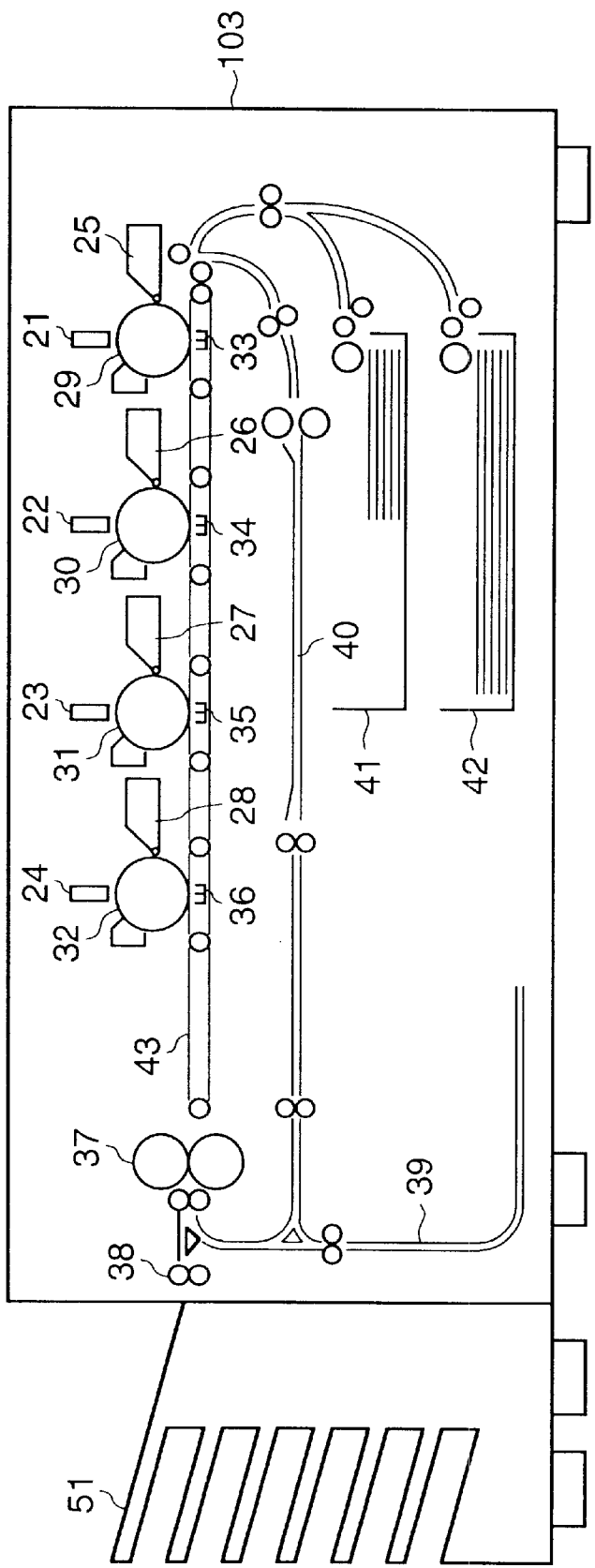
FIG. 20 is an explanatory sectional view showing the mechanical structure of the printing device.

In FIGS. 19 and 20, the scanning device and printing device are arranged separately from each other. Alternatively, the scanning device and printing device may be integrated with each other.

System Operation

The operation of this embodiment will be explained with reference to FIGS. 5A to 16.

Figure 5B:
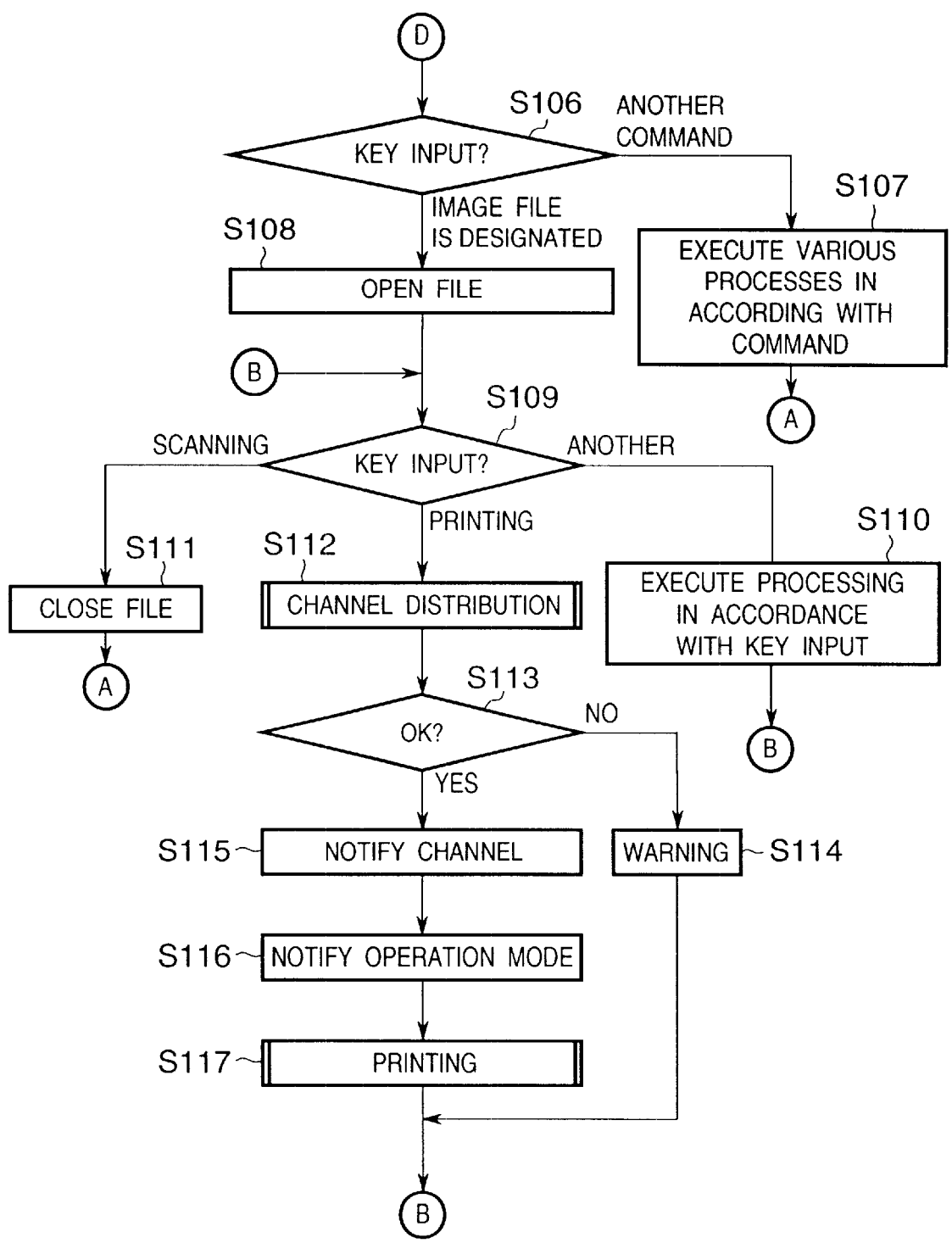

FIGS. 5A and 5B are flow charts showing the main routine of the computer 101 according to this embodiment. The operation of the computer 101 will be described with reference to FIGS. 5A and 5B.

When the computer 101 is turned on, the controller 201 initializes a flag, register, control variable, and the like, and executes a control program such as an operating system stored in the second memory 205 after temporarily reading out the control program to the first memory 203 in units of predetermined amounts via the bus bridge 204 having a memory controller function. Then, the controller 201 initializes the respective units of the computer 101 (S101).

If a new device including the computer 101 is connected to the high-speed serial communication I/F cable 104, 105, 106, or 107 (YES in S102), the controller 201 performs device search processing S103.

Details of device search processing S103 will be described with reference to FIG. 6.

If the device such as the scanning device 102 connected to the high-speed serial communication I/F cable 104, 105, 106, or 107 requests channel allocation using the Async transfer mode (YES in S104), the controller 201 executes channel distribution processing S118 of being allocated, via the high-speed serial communication unit 208, a necessary number of channels for which a data transfer period such as the Iso transfer mode is guaranteed on the high-speed serial communication I/F cables 104 and 105.

Details of channel distribution processing S118 will be described with reference to FIG. 7, later.

If channels are normally distributed as a result of channel distribution processing (YES in S119), the controller 201 notifies the connected device, such as the scanning device 102, requesting channel allocation of a number for identifying one or a plurality of channels using the Async transfer mode (S120). Then, the controller 201 returns to S102.

If channel distribution fails as a result of channel distribution processing (NO in S119), the controller 201 notifies the connected device, such as the scanning device 102, requesting channel allocation of the error using the Async transfer mode (S121). Then, the controller 201 returns to S102.

If the scanning device 102 notifies the controller 201 using the Async transfer mode of a number for identifying one or a plurality of channels which are allocated by the scanning device 102 and used in the Iso transfer mode (YES in S105), the controller 201 stores the notified number in the second memory 205, and performs predetermined settings necessary for receiving image data using the Iso transfer mode (S122). After that, the controller 201 performs scan data reception processing S123 of receiving image data from the scanning device 102 in the Iso transfer mode and sequentially storing the received data in the second memory 205.

Details of scan data reception processing S123 will be described with reference to FIG. 9.

If an input from the key, touch panel, digitizer, or the like of the operation unit 215 is not a command input for designating and opening an image file to be printed but a command input for executing another processing (S106), the controller 201 executes various processes corresponding to the input command (S107), and returns to step S102 upon the completion of various processes.

If an input from the key, touch panel, digitizer, or the like of the operation unit 215 is an input for designating and opening an image file to be printed (S106), the controller 201 reads the designated image file in the second memory 205 from the third memory 214, via the network connection unit 207, or via the high-speed serial communication I/F cables 104 and 105 (S108).

If an input from the operation unit 215 is neither a command input for printing the opened file nor command input for closing the opened image file but a command input for executing another processing (S109), the controller 201 executes various processes corresponding to the input (S110), and returns to S109 upon the completion of various processes.

If an input from the operation unit 215 is an input for closing the opened image file (S109), the controller 201 closes the image file read in the second memory 205 to make available the released area of the second memory 205 (S111).

If the contents of the image file must be changed and stored, the controller 201 stores the changed image file as a new image file in the third memory 214, via the network connection unit 207, or via high-speed serial communication I/F cables 104 and 105 (S111).

If an input from the operation unit 215 is an input for printing the opened image file by the printing device 103 (S109), the controller 201 performs channel distribution processing S112 for being allocated, via the high-speed serial communication unit 208, a necessary number of channels for which a data transfer period such as the Iso transfer mode is guaranteed on the high-speed serial communication I/F cables 104 and 105.

Details of channel distribution processing S112 will be explained with reference to FIG. 7.

If any error occurs in channel distribution (NO in S113), the controller 201 outputs a predetermined warning by an image, speech, or sentence on the display unit 211 (S114), and returns to S109.

If no error occurs in channel distribution (YES in S113), the controller 201 notifies the printing device 103 of a number for identifying one or a plurality of allocated channels via the high-speed serial communication unit 208, high-speed serial communication connector 210, and high-speed serial communication I/F cable 105 using the Async transfer mode (S115).

Based on one or a plurality of allocated channels, the controller 201 sets the operation mode in print operation (S116).

The controller 201 transfers image data to the printing device 103 using one or a plurality of channels of which it notified the printing device 103. The controller 201 performs printing processing S117 of printing image data by the printing device 103, and returns to S109 upon the completion of printing processing.

Details of printing processing S119 will be described with reference to FIG. 10.

Figure 6:
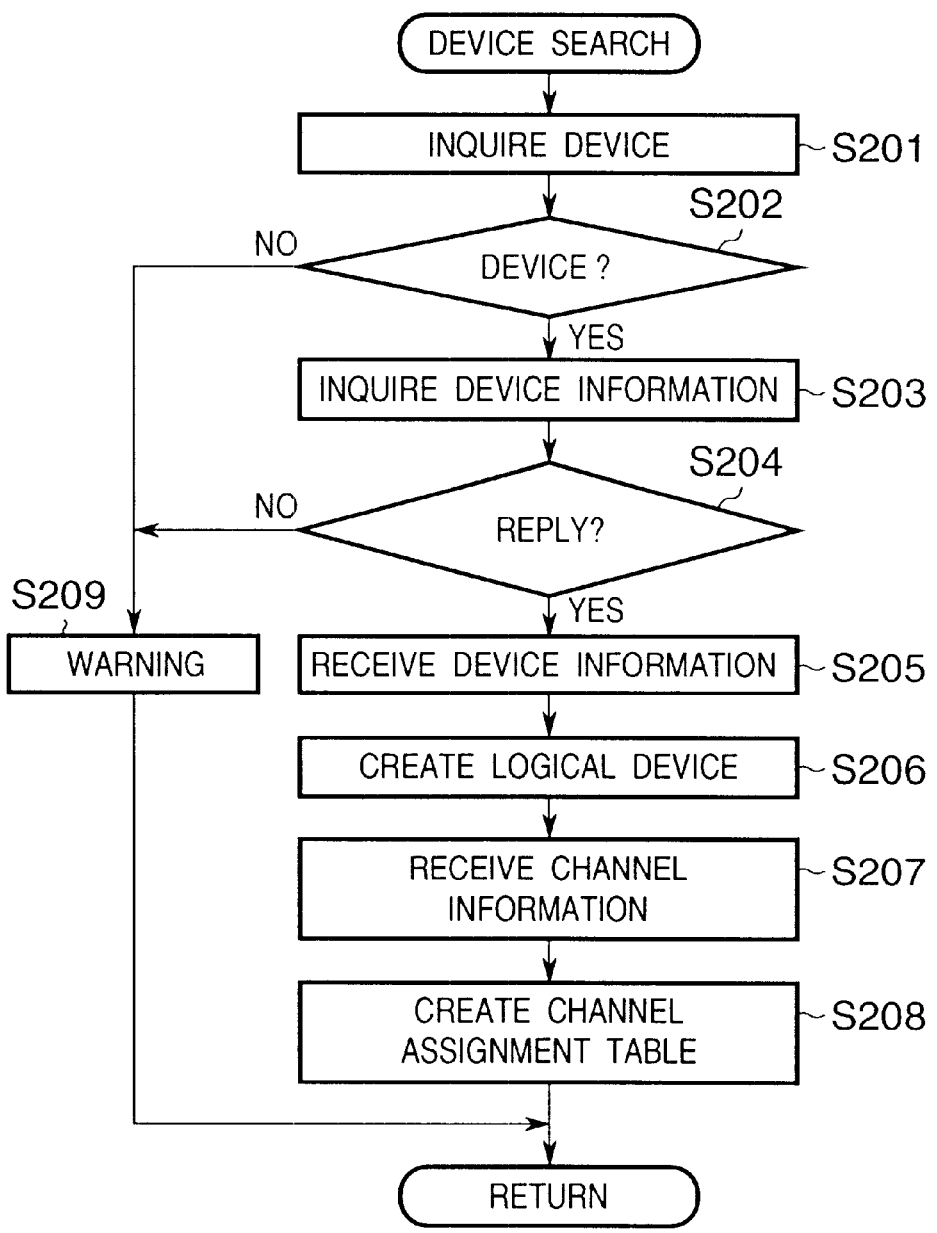
FIG. 6 is a flow chart showing the device search routine of the computer.

FIG. 6 is a flow chart showing details of device search processing in S103 of FIG. 5.

The controller 201 inquires via the high-speed serial communication unit 208 whether a device newly connected to the high-speed serial communication I/F cable 104, 105, 106, or 107 is a scanner such as a scanning device capable of scanning and transmitting image data or a printer such as a printing device capable of receiving and printing image data (S201).

If a target scanner such as a scanning device or a target printer such as a printing device, e.g., the scanning device 102 or printing device 103 exists on the high-speed serial communication I/F cable 104, 105, 106, or 107 (YES in S202), the controller 201 subsequently inquires device information (S203).

If, for example, the scanning device 102 or printing device 103 returns device information as a reply (YES in S204), the controller 201 stores the replied device information in the second memory 205, and creates an operation mode correspondence table in accordance with the stored device information (S205).

For a scanner such as a scanning device, the device information includes the resolution of scanning elements, the number of lines of scanning elements, the type of color filter, the distance between respective scanning elements, the scanning speed, the misalignment correction amount between respective scanning elements, the white balance correction amount, the shading correction amount, and operation mode information.

For a printer such as a printing device, the device information includes the number of photosensitive drums, the type of print color, the distance between respective photosensitive drums, the print speed, the misregistration correction amount between respective photosensitive drums, and operation mode information.

The operation mode correspondence table is a list used to select a combination of operation modes between respective devices when channels used by respective devices for data transfer must be shared on a high-speed serial I/F for which a data transfer period such as the Iso transfer mode is guaranteed.

This table makes it possible to determine the priority order of processing operation of each device and distribute channels used by the device for data transfer in accordance with the priority order.

An example of the operation mode correspondence table is shown in FIG. 17. As shown in FIG. 17, the device priority determines a mode (scanner priority mode, printer priority mode, DV priority mode, or the like). The mode is selected arbitrarily by a user's input or automatically by another setting.

To scan and receive image data or to transfer and print image data, the controller 201 creates a logical device or logical devices used in an operating system for the scanning device 102 or printing device 103 (S206).

The controller 201 stores channel information returned from one or a plurality of created logical devices in the second memory 205 (S207). The controller 201 creates a channel allocation table in accordance with the stored channel information (S208), and completes device search processing routine S103.

This channel information represents the number of channels used by each device for data transfer on a high-speed serial I/F for which a data transfer period such as the Iso transfer mode is guaranteed.

By referring to the channel allocation table, the number of channels used by each device and their numbers can be obtained.

An example of the channel allocation table is shown in FIG. 18.

In FIG. 18, the number of channels allocated by each device is listed. Alternatively, the channels numbers allocated by each device may be listed, or both the number of channels allocated by each device and the channel numbers may be listed.

If no target device such as the printing device exists on the high-speed serial communication I/F cable 104, 105, 106, or 107 (NO in S202), or no device information is replied (NO in S204), the controller 201 outputs a predetermined warning by an image, speech, or sentence on the display unit 211 (S209), and ends device search processing routine S103.

Figure 7:
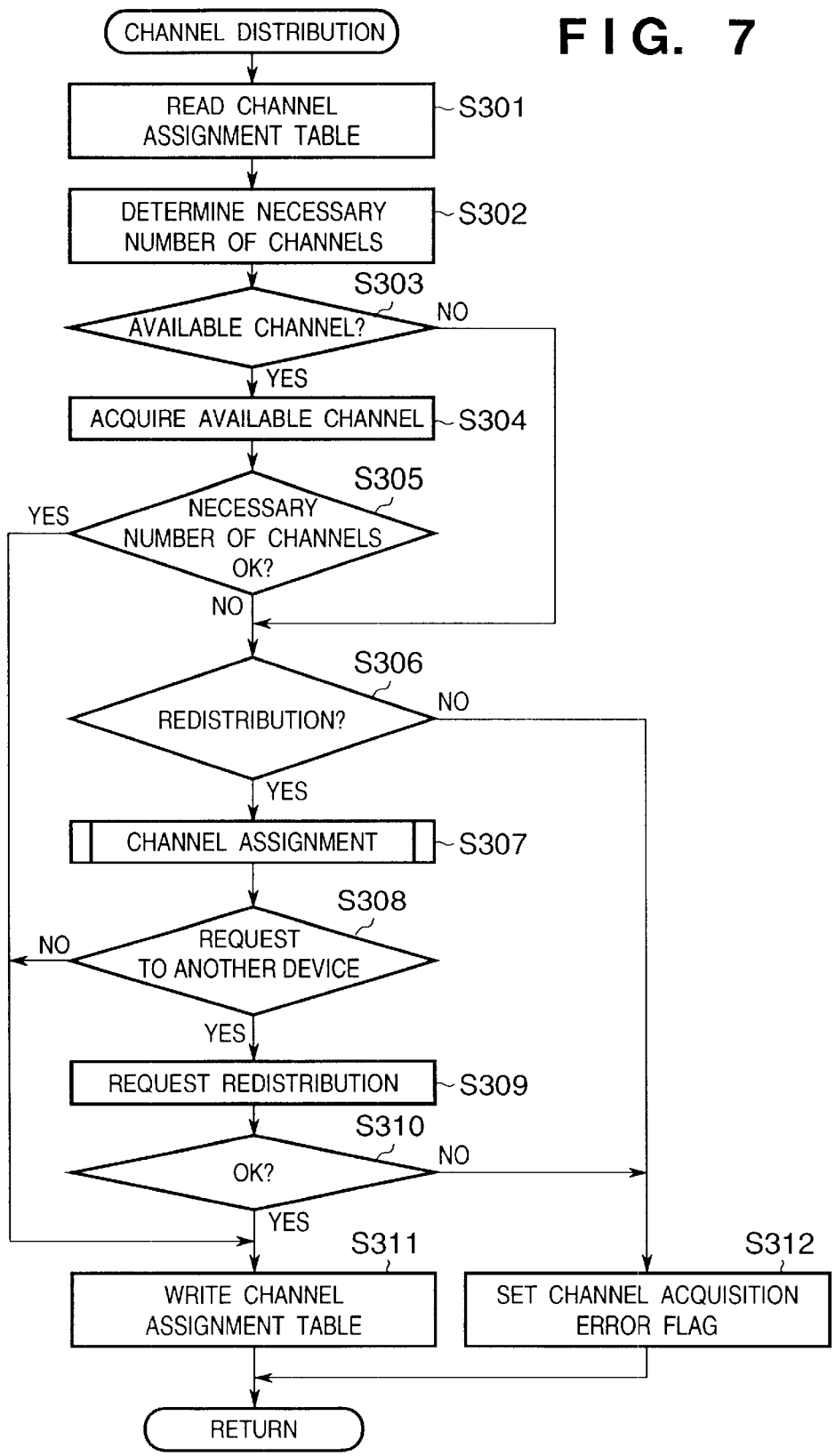
FIG. 7 is a flow chart showing the channel distribution routine of the computer.

FIG. 7 is a flow chart showing details of channel distribution processing in S112 and S118 of FIG. 5.

The controller 201 reads the channel allocation table stored in the second memory 205 (S301). In accordance with the contents of the channel allocation table, the controller 201 determines the number of channels necessary for data transfer to a printer device on a high-speed serial I/F for which a data transfer period such as the Iso transfer mode is guaranteed (S302).

If a channel is available in the Iso transfer mode (YES in S303), the controller 201 allocates available channel in accordance with the determined necessary number of channels (S304).

If no channels is available in the Iso transfer mode (NO in S303), the controller 201 shifts to S306.

If the necessary number of channels can be allocated (YES in S305), the controller 201 updates the channel allocation table temporarily stored in the second memory 205 (YES in S310), and completes channel acquisition processing routine S112.

If the necessary number of channels cannot be allocated (NO in S305), the controller 201 checks from the contents of the channel allocation table whether any of channels allocated by another device can be redistributed (S306).

For example, assume that a given scanner device allocates channels. If the operation of the device can be suspended, its channels can be used while the device suspends its operation. Using these channels, the controller 201 can transfer data to a printing device to print the data. In this manner, the controller 201 checks whether any of channels allocated by another device can be redistributed.

If the controller 201 determines that channels can be redistributed (YES in S306), the controller 201 performs channel allocation processing between devices including the computer 101 (S307).

Details of channel allocation processing S307 will be explained with reference to FIG. 8.

If the controller 201 determines as a result of channel allocation that channel redistribution must be requested of another device (YES in S308), the controller 201 requests channel redistribution of another device (S309). If another device notifies the controller 201 of permission of redistribution (YES in S310), the controller 201 updates the channel allocation table (S311), and completes the channel acquisition routine in S112 or S118.

If the controller 201 determines from the contents of the channel allocation table that channel redistribution is impossible (NO in S306), or is notified of rejection of redistribution by another device (NO in S310), the controller 201 sets a channel acquisition error flag (S312), and completes the channel acquisition routine in S112 or S118.

Figure 8:
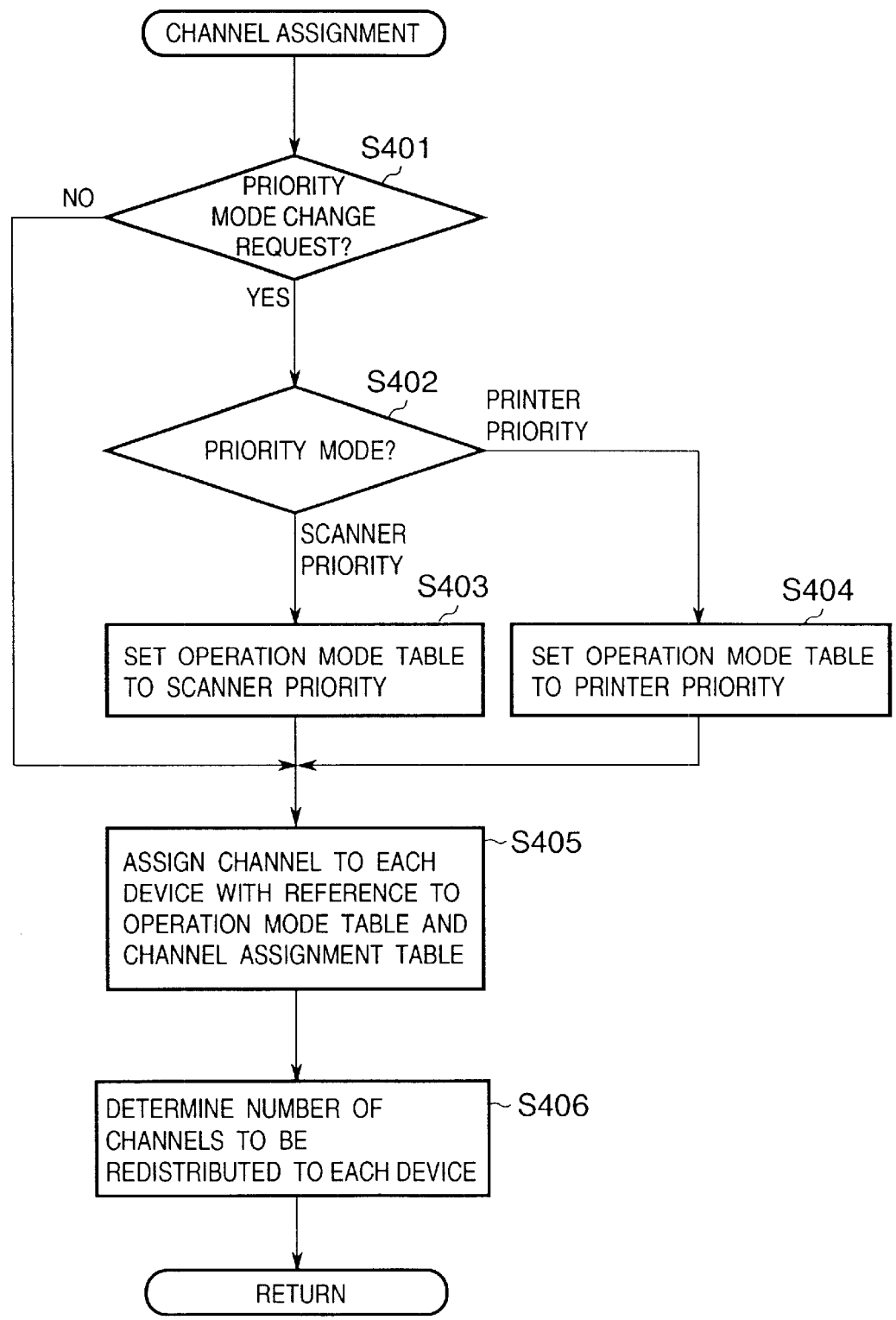
FIG. 8 is a flow chart showing the channel allocation routine of the computer.

FIG. 8 is a flow chart showing details of channel allocation processing in S307 of FIG. 7.

If the controller 201 receives a request to change the priority mode between a scanning device such as a scanner and a printing device such as a printer (YES in S401), and the requested priority mode is scanner priority (S402), the controller 201 sets the operation mode correspondence table stored in the second memory 205 to scanner priority (S403).

If the requested priority mode is printer priority (S402), the controller 201 sets the operation mode correspondence table to printer priority (S404).

If priority mode is not changed (NO in S401), the controller 201 advances to S405.

Referring to the operation mode correspondence table and channel allocation table stored in the second memory 205, the controller 201 determines a proper value among combinations of the numbers of channels allocated by respective devices and operation modes, and assigns channels to the devices (S405).

The controller 201 determines the number of channels to be redistributed that are requested of each device (S406), and completes channel allocation processing routine S307.

Figure 9:
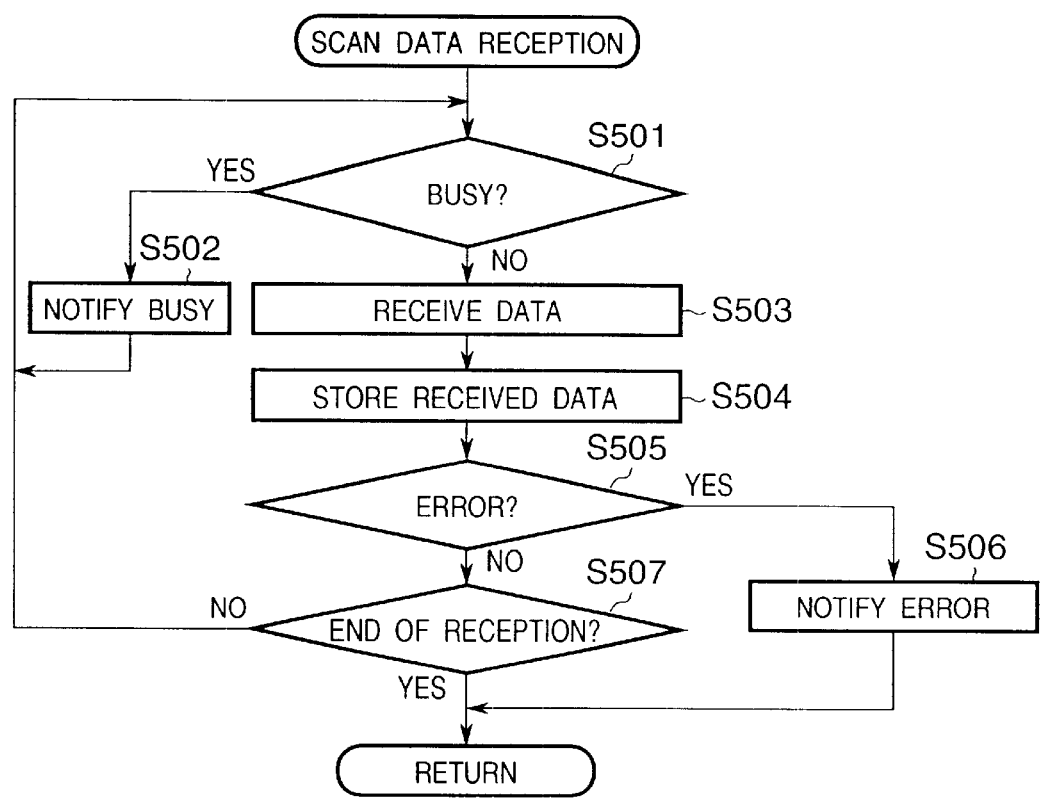
FIG. 9 is a flow chart showing the scan data reception routine of the computer.

FIG. 9 is a flow chart showing details of scan data reception processing in S123 of FIG. 5.

If the controller 201 is busy so as not to receive any data from the scanning device 102 (YES in S501), the controller 201 notifies the scanning device 102 of a busy status using the Async transfer mode (S502), and returns to S501.

If the controller 201 becomes ready to receive data (NO in S501), it cancels the busy status. As a result, the scanning device 102 starts transmitting image data in the Iso transfer mode, and the controller 201 starts receiving the image data via the high-speed serial communication unit 208 (S503).

The controller 201 sequentially stores the data received in the Iso transfer mode in the second memory 205 (S504).

If the controller 201 normally receives image data from the scanning device 102 (NO in S505), the controller 201 returns to S501 to repeat a series of processes until the scanning device 102 notifies the controller 201 of the end of scanning using the Async transfer mode (YES in S507).

If any error occurs while the controller 201 is receiving image data from the scanning device 102 (YES in S505), the controller 201 notifies the scanning device 102 of an error status using the Async transfer mode (S506), and completes scan data reception processing routine S123.

If NO in S505, and the scanning device 102 notifies the controller 201 of the end of scanning (YES in S507), the controller 201 completes scan data reception processing routine S123.

Figure 10:
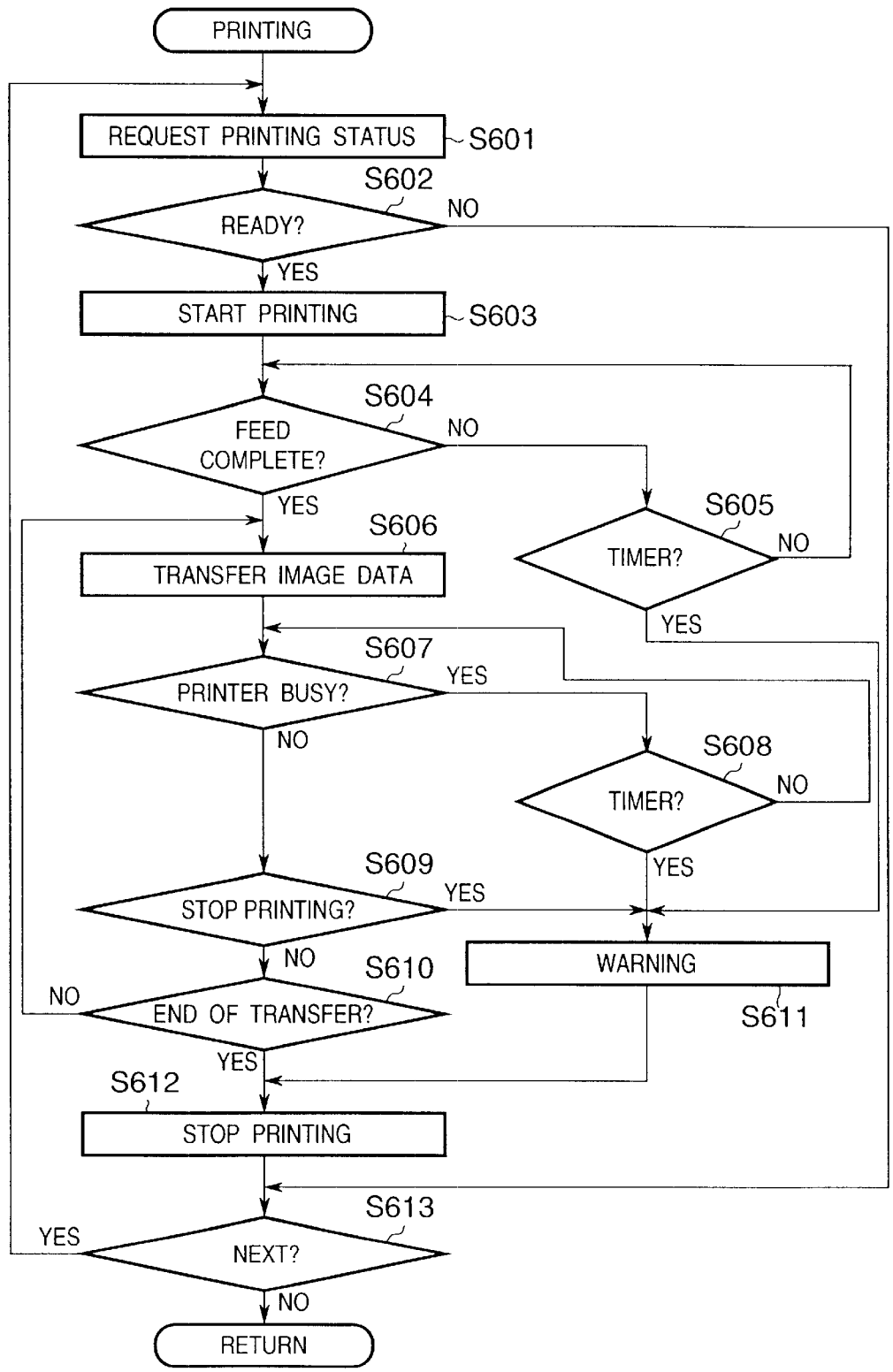
FIG. 10 is a flow chart showing the printing routine of the computer.

FIG. 10 is a flow chart showing details of printing processing in S117 of FIG. 5.

The controller 201 requests transmission of the printer status of a target printer such as a printing device, for example, the printing device 103 via the high-speed serial communication unit 208 and high-speed serial communication I/F cables 104, 105, 106, and 107 using the Async transfer mode (S601).

If the printing device 103 returns a READY status representing "ready" (YES in S602), the controller 201 transmits a print start instruction to the printing device 103 using the Async transfer mode (S603).

If the printing device 103 does not reply any READY status (NO in S602), the controller 201 shifts to S613.

The controller 201 waits, only for a predetermined time, for a feed end notification from the printing device 103 using the Async transfer mode (S604 and S605). If the controller 201 receives a feed end notification (YES in S604), it starts transferring image data to the printing device 103 in the Iso transfer mode using one or a plurality of allocated channels for data transfer for which a data transfer period is guaranteed (S606).

If the controller 201 receives a printer busy notification from the printing device 103 using the Async transfer mode during transfer of image data in the Iso transfer mode (YES in S607), the controller 201 waits for a predetermined time (S608), and then suspends transfer of image data in the Iso transfer mode.

If the printer busy status continues even upon the lapse of the predetermined time (YES in S608), or the controller 201 receives a print stop input from the operation unit 215 (YES in S609), the controller 201 outputs a predetermined warning by an image, speech, or sentence on the display unit 211 (S611), and sends a print stop command to the printing device 103, thereby stopping print operation (S612).

If the controller 201 does not receive any print stop input from the operation unit 215 (NO in S609), the controller 201 returns to S606 to repeat a series of processes until image data has been transferred (YES in S610).

If image data has been transferred (YES in S610), the controller 201 sends a print stop command to the printing device 103, thereby stopping print operation (S612).

If next image data is to be subsequently printed (YES in S613), the controller 201 returns to S601 to repeat a series of operations.

If NO in S613, the controller 201 completes printing processing routine S117.

FIG. 11 is a flow chart showing the main routine of the scanning device 102 according to this embodiment.

When the scanning device 102 is turned on, the controller 301 initializes a flag, register, control variable, and the like, and executes a control program such as an operating system stored in the first memory 302. At the same time, the controller 301 initializes the respective units of the scanning device 102 (S701).

If a new device including the scanning device 102 is connected to the high-speed serial communication I/F cable 104, 105, 106, or 107 (YES in S702), the controller 301 performs device search response processing S703.

Details of device search response processing S703 will be described with reference to FIG. 12.

If no new device is connected (NO in S702), the controller 301 shifts to S704.

If the controller 301 receives a command requesting the printer status from the computer 101 via the high-speed serial communication I/F cable 105 and 106 (YES in S704), the controller 301 transmits the status to the computer 101 using the Async transfer mode (S705), and returns to S702.

If the controller 301 receives a channel redistribution request command from another device such as the computer 101 connected by a high-speed serial communication I/F via the high-speed serial communication I/F cable 105 using the Async transfer mode (YES in S706), the controller 301 performs channel redistribution processing S707 for one or a plurality of allocated channels.

Details of channel redistribution processing S707 will be described with reference to FIG. 13.

If the controller 301 does not receive any channel redistribution request (NO in S706), it advances to S708.

If the controller 301 is not instructed to start scanning by an input from the operation unit 305 or a command from the computer 101 (NO in S708), the controller 301 returns to S702.

If the controller 301 is instructed to start scanning by an input from the operation unit 305 or a command from the computer 101 (YES in S708), the controller 301 performs channel acquisition processing of being allocated, via the high-speed serial communication unit 308, a necessary number of channels for which a data transfer period such as the Iso transfer mode is guaranteed on the high-speed serial communication I/F cables 105 and 106 (S709).

If channels are normally allocated (YES in S710), the controller 301 shifts to S714.

If channel acquisition fails (NO in S710), the controller 301 transmits a channel allocation request command to the computer 101 via the high-speed serial communication unit 308, high-speed serial communication connector 310, and high-speed serial communication I/F cable 105 using the Async transfer mode (S711).

If a channel allocation result notification from the computer 101 in the Async transfer mode represents that allocation is possible (YES in S712), the controller 301 shifts to S714.

If the channel allocation result notification from the computer 101 in the Async transfer mode represents that allocation is impossible (NO in S712), the controller 301 outputs a predetermined warning by an image, speech, or sentence on the display unit 304 (S713), and returns to S702.

Note that if the controller 301 is instructed to start scanning by a command from the computer 101, the controller 301 sends an error status to the computer 101 using the Async transfer mode (S713), and returns to S702.

The controller 301 notifies the computer 101 of a number or numbers identifying one or a plurality of allocated channels via the high-speed serial communication unit 308, high-speed serial communication connector 310, and high-speed serial communication I/F cable 105 using the Async transfer mode (S714).

If one or a plurality of allocated channels are redistributed, the controller 301 sets the operation mode in scanning operation on the basis of the one or plurality of channels redistributed (S715).

If the computer 101 can receive scanned data (YES in S716), the controller 301 advances to S717.

If the computer 101 cannot receive any scanned data (NO in S716), the controller 301 returns to S702.

If one or a plurality of channels of which the computer 101 is notified are redistributed, the controller 301 performs scanning execution processing S717 of transferring scanned image data to the computer 101 using the one or plurality of channels redistributed.

Details of scanning execution processing S717 will be described with reference to FIG. 14.

If the controller 301 stops scanning in accordance with an input from the operation unit 305 or a command from the computer 101 (YES in S718), the controller 301 performs predetermined processing necessary for the scanning device 102 (S722), and then returns to S702.

If scanning execution processing S717 fails (NO in S719), the controller 301 notifies the computer 101 of an error status using the Async transfer mode (S720). The controller 301 performs predetermined processing necessary for the scanning device 102 (S722), and then returns to S702.

If scanning execution processing S717 is normally completed (YES in S719), and next image data must be subsequently scanned (YES in S721), the controller 301 returns to S717 to repeat a series of operations.

If no next image data need be scanned (NO in S721), the controller 301 performs predetermined end processing necessary for the scanning device 102 (S722), and then returns to S702.

Figure 11A:
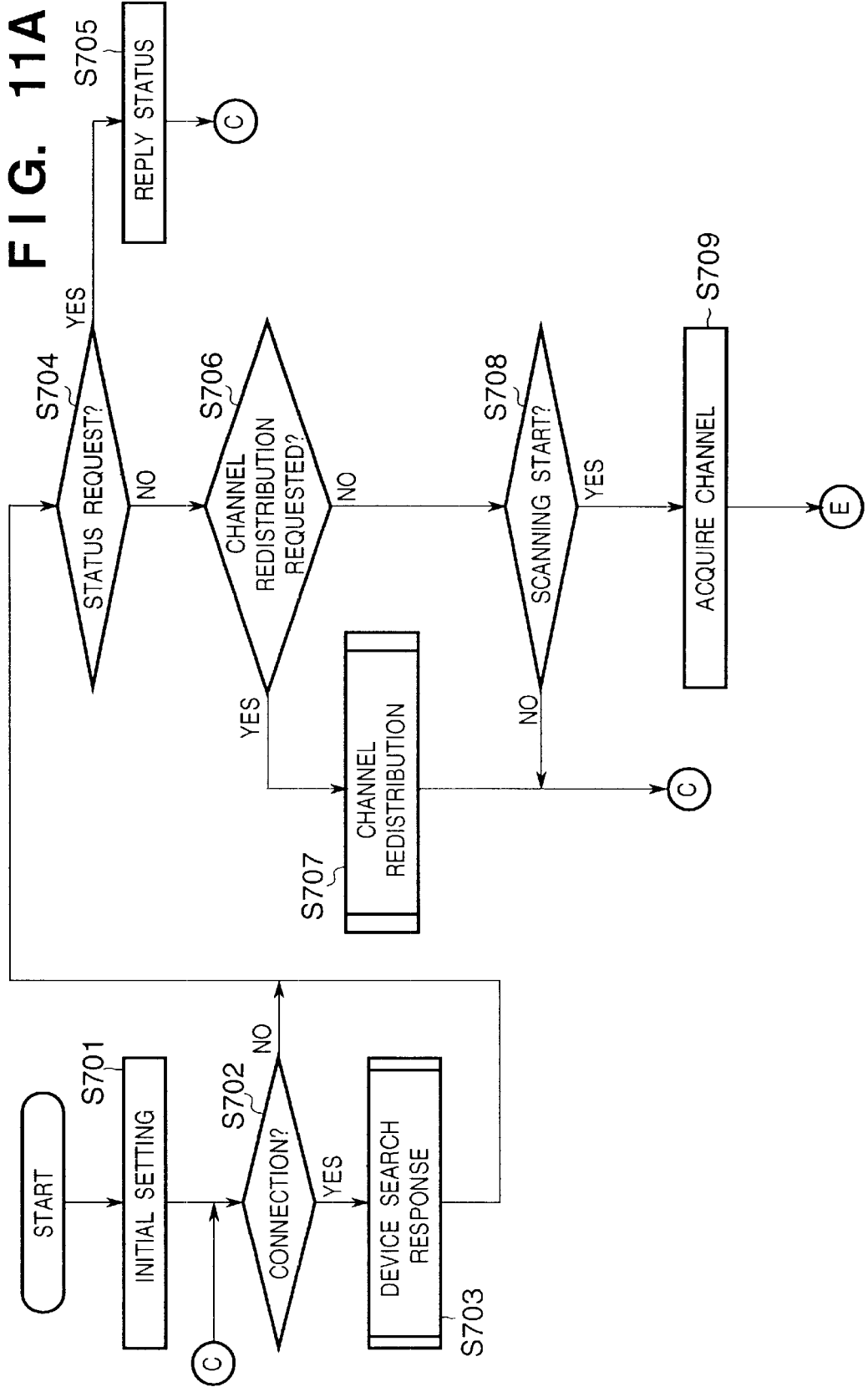
FIGS. 11A and 11B are flow charts showing the main routine of the scanning device.
Figure 11B:
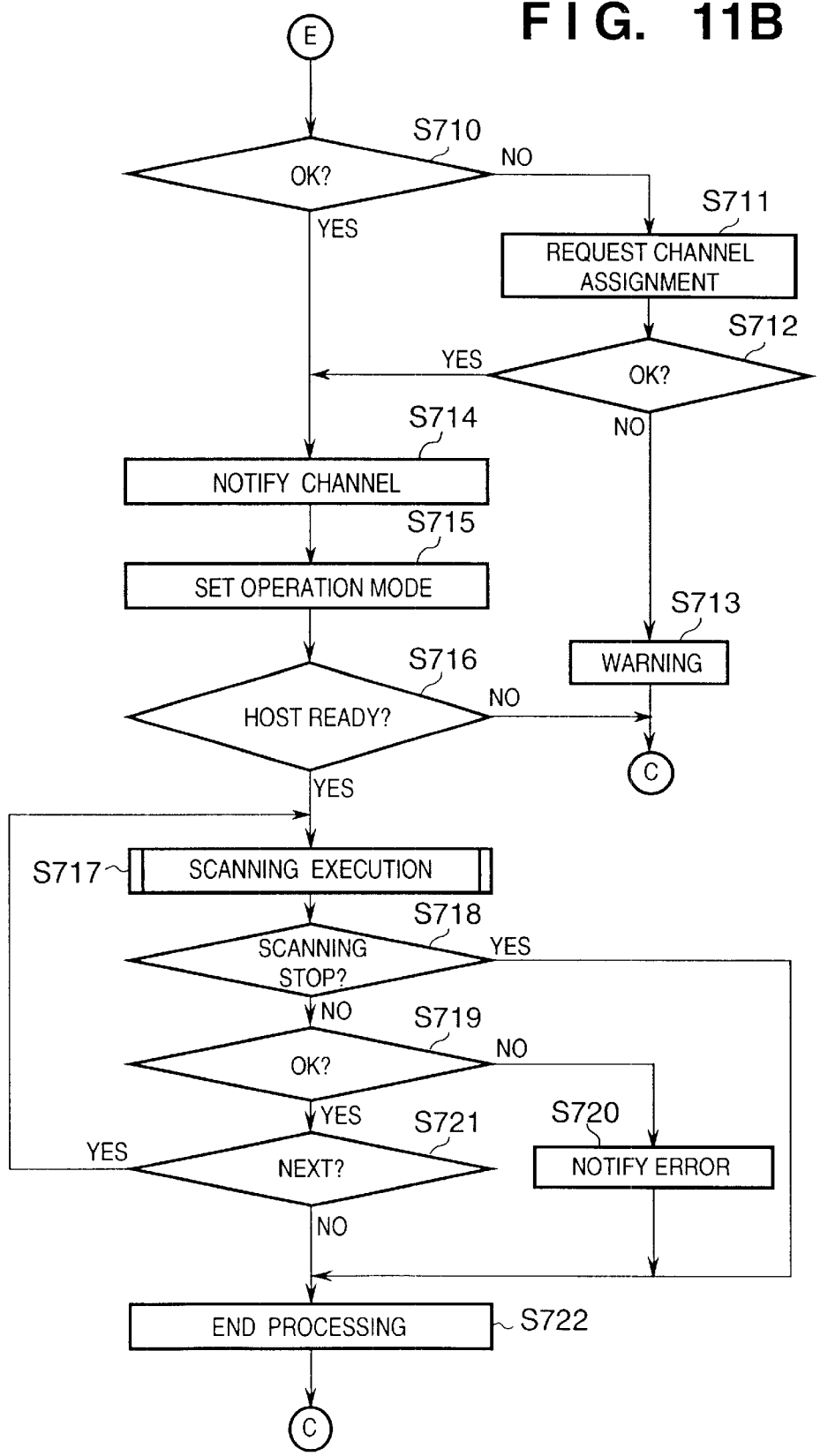
Figure 12:
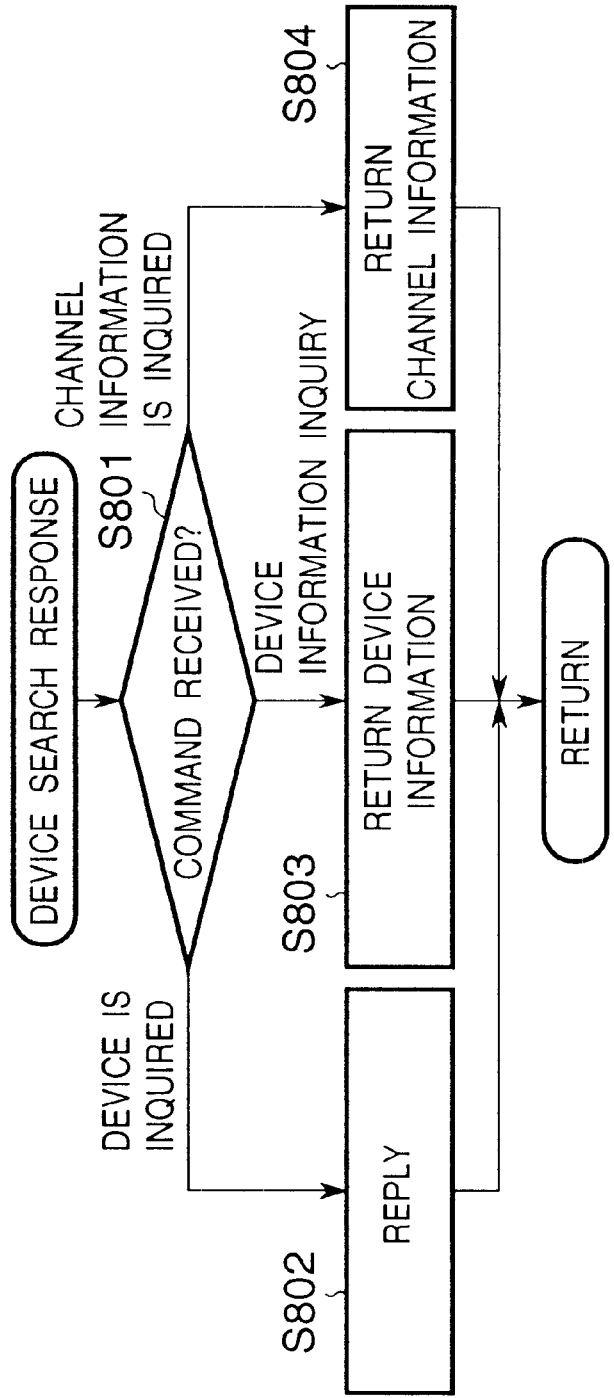
FIG. 12 is a flow chart showing the device search response routine of the scanning device and printing device.
Figure 15:
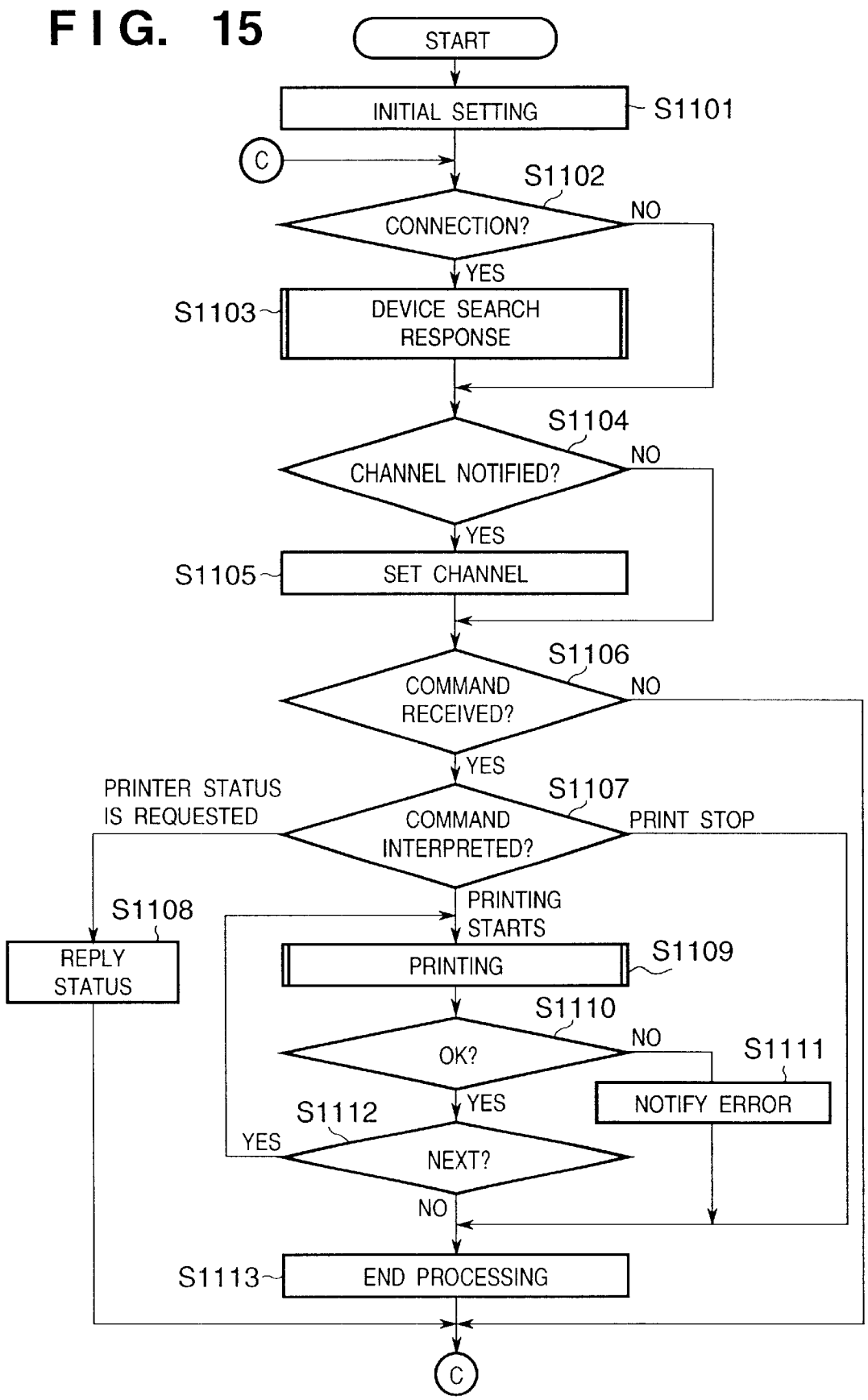
FIG. 15 is a flow chart showing the main routine of the printing device.

FIG. 12 is a flow chart showing details of device search response processing in S703 of FIG. 11 and S1103 of FIG. 15.

If the controller 301 or 401 receives a command from the computer 101 via the high-speed serial communication I/F cables 105 and 106 using the Async transfer mode, the controller 301 or 401 interprets the received command (S801)

If the received command is a device inquiry command inquiring whether a device is a scanner such as a scanning device capable of transferring scanned image data to the computer 101, or a printer such as a printing device capable of printing image data transferred from the computer 101 (S801), the controller 301 or 401 replies "OK" to the computer 101 using the Async transfer mode (S802), and completes the device search response processing routine in S703 or S1103.

If the received command is a command inquiring for device information (S801), the controller 301 or 401 returns the device information to the computer 101 using the Async transfer mode (S803).

For a scanner such as a scanning device, the device information includes the resolution of scanning elements, the number of lines of scanning elements, the type of color filter, the distance between respective scanning elements, the scanning speed, the misalignment correction amount between respective scanning elements, the white balance correction amount, the shading correction amount, and operation mode information.

For a printer such as a printing device, the device information includes the number of photosensitive drums, the type of print color, the distance between respective photosensitive drums, the print speed, the misregistration correction amount between respective photosensitive drums, and operation mode information.

If the controller 301 or 401 has returned the device information (S803), it ends the device search response processing routine in S703 or S1103.

If the received command is a command inquiring for used-channel information (S801), the controller 301 or 401 returns the used-channel information to the computer 101 using the Async transfer mode (S804).

This channel information represents the number of channels used by each device for data transfer on a high-speed serial I/F for which a data transfer period such as the Iso transfer mode is guaranteed.

If the controller 301 or 401 has returned the device information (S804), it ends the device search response processing routine in S703 or S1103.

Figure 13:
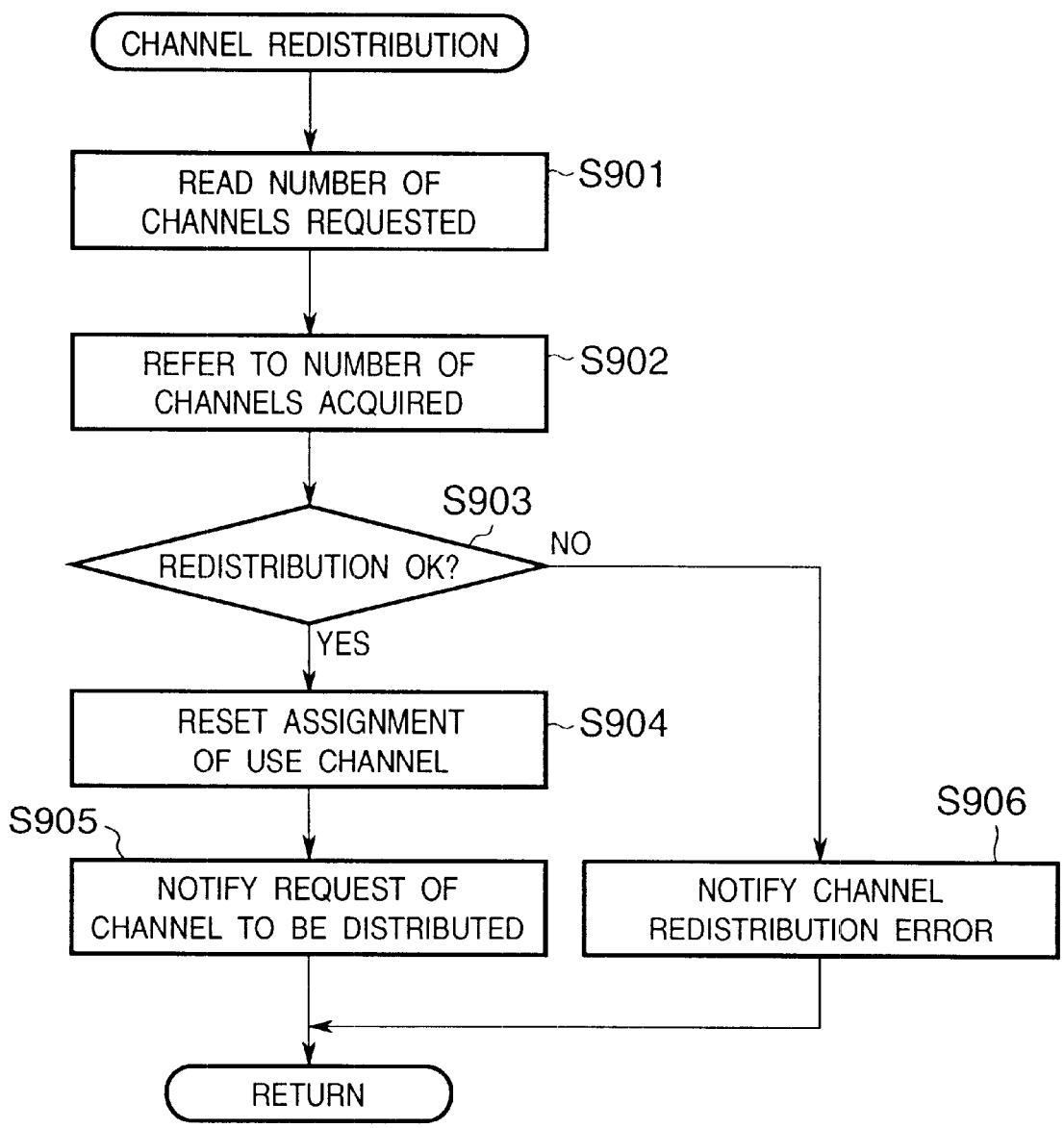
FIG. 13 is a flow chart showing the channel redistribution routine of the scanning device.

FIG. 13 is a flow chart showing details of channel redistribution processing in S707 of FIG. 11.

The controller 301 reads the number of channels requested from information included in a channel redistribution request command notified from another device connected by a high-speed serial communication I/F, e.g., the computer 101 via the high-speed serial communication I/F cable 105 using the Async transfer mode (S901). The controller 301 refers to the number of channels having already been allocated (S902).

If channel redistribution for the requested number of channels cannot be done as a result of considering the combination of the number of allocated channels and operation mode (NO in S903), the controller 301 notifies the computer 101 of a channel redistribution error (S906), and completes channel redistribution processing routine S707.

If channel redistribution for the requested number of channels can be done as a result of considering the combination of the number of allocated channels and operation mode (YES in S903), the controller 301 resets allocation of used channels (S904).

Accordingly, the number of channels necessary for executing a newly set operation mode can be allocated, and thus one or a plurality of channels which can be reassigned can be provided to a request source device.

The controller 301 notifies the request source device, e.g., computer 101 of the number or numbers of the channel or channels to be redistributed, and completes channel redistribution processing routine S707.

Figure 14:
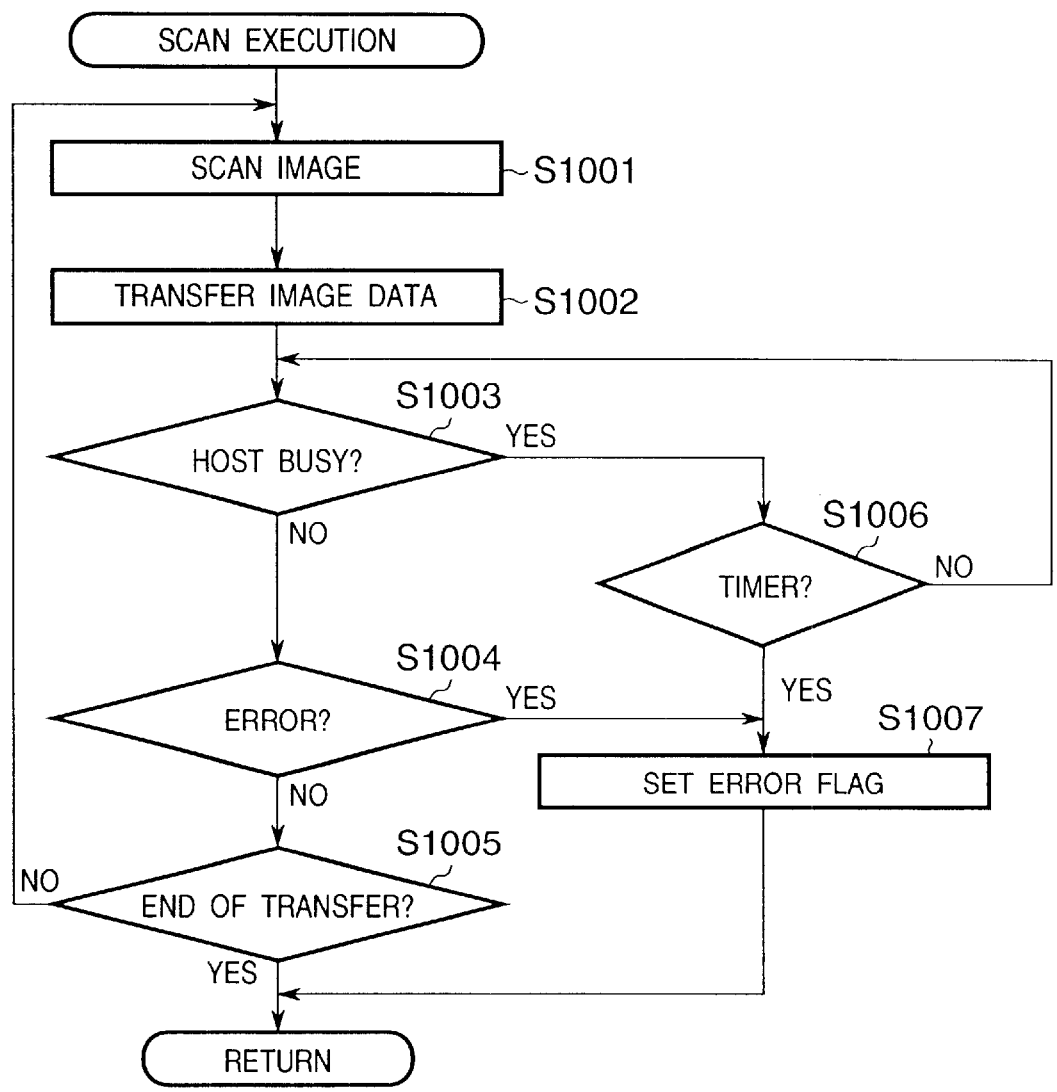
FIG. 14 is a flow chart showing the scanning execution routine of the scanning device.

FIG. 14 is a flow chart showing details of scanning execution processing in S717 of FIG. 11B.

The controller 301 scans an original image by the scanning units 341, 342, and 343 (S1001), and sends the scanned image data of respective colors to the image processing units 331, 332, and 333.

After the image processing units 331, 332, and 333 execute predetermined image processes such as shading correction, white balance correction, and masking correction, the controller 301 transfers image data to the computer 101 via the high-speed serial communication unit 308, high-speed serial communication connector 309, and high-speed serial communication I/F cable 105 using the Iso transfer mode (S1002).

If the computer 101 does not inform the controller 301 of a host busy status cancel command using the Async transfer mode within a predetermined time (S1006) (YES in S1003), the controller 301 sets an error flag (S1007) to complete scanning execution processing routine S714.

If the computer 101 notifies the controller 301 of a host busy status cancel command using the Async transfer mode (NO in S1003), the controller 301 checks in S1004 whether image data is normally being transferred. If image data is normally transferred (NO in S1004), the controller 301 repeats processes in S1001 to S1005 until it determines in S1005 that transfer of image data is complete.

If an error occurs during transfer of image data to the computer 101 (YES in S1004), the controller 301 sets an error flag (S1007) to complete scanning execution processing routine S714.

If the controller 301 determines in S1005 that transfer of image data is complete, it ends scanning execution processing routine S714.

FIG. 15 is a flow chart showing the main routine of the printing device 103 according to this embodiment.

The operation of the printing device 103 will be explained with reference to FIG. 15.

When the printing device 103 is turned on, the controller 401 initializes a flag, register, control variable, and the like, and executes a control program such as an operating system stored in the first memory 402. At the same time, the controller 401 initializes the respective units of the printing device 103 (S1101).

If a new device including the printing device 103 is connected to the high-speed serial communication I/F cable 104, 105, 106, or 107 (YES in S1102), the controller 401 performs device search response processing S1103.

Details of device search response processing S1103 have been described with reference to FIGS. 11A and 11B.

If no new device is connected (NO in S1102), the controller 401 shifts to S1104.

If the computer 101 notifies the printing device 103 via the high-speed serial communication I/F cables 105 and 106 using the Async transfer mode of a number or numbers identifying one or a plurality of channels which are allocated by the computer 101 and used in the Iso transfer mode, the controller 401 stores the notified number or numbers in the first memory 402. The controller 401 performs predetermined settings necessary for receiving image data using the Iso transfer mode (S1105).

If the computer 101 does not inform the controller 401 of any number identifying channels (NO in S1104), the controller 401 shifts to S1106.

If the controller 401 receives a command from the computer 101 via the high-speed serial communication I/F cables 105 and 106 using the Async transfer mode (YES in S1106), the controller 401 interprets the received command (S1107). If the received command is a command requesting the printer status (S1107), the controller 401 returns the status to the computer 101 using the Async transfer mode (S1108), and returns to S1102.

If the received command is a command notifying the start of printing (S1107), the controller 401 executes printing processing S1109.

Details of printing processing S1109 will be described with reference to FIG. 15.

If any error occurs in printing processing S1109, the controller 401 notifies the computer 101 of an error status using the Async transfer mode (S1111). The controller 401 performs predetermined end processing necessary for the printing device 103 (S1113), and then returns to S1102.

If no error occurs in printing processing (YES in S1110), and next image data must be subsequently printed (YES in S1112), the controller 401 returns to S1109 to repeat a series of operations.

If no next image data need be printed (NO in S1112), the controller 401 performs predetermined end processing necessary for the printing device 103 (S1113), and then returns to S1102.

Figure 16:
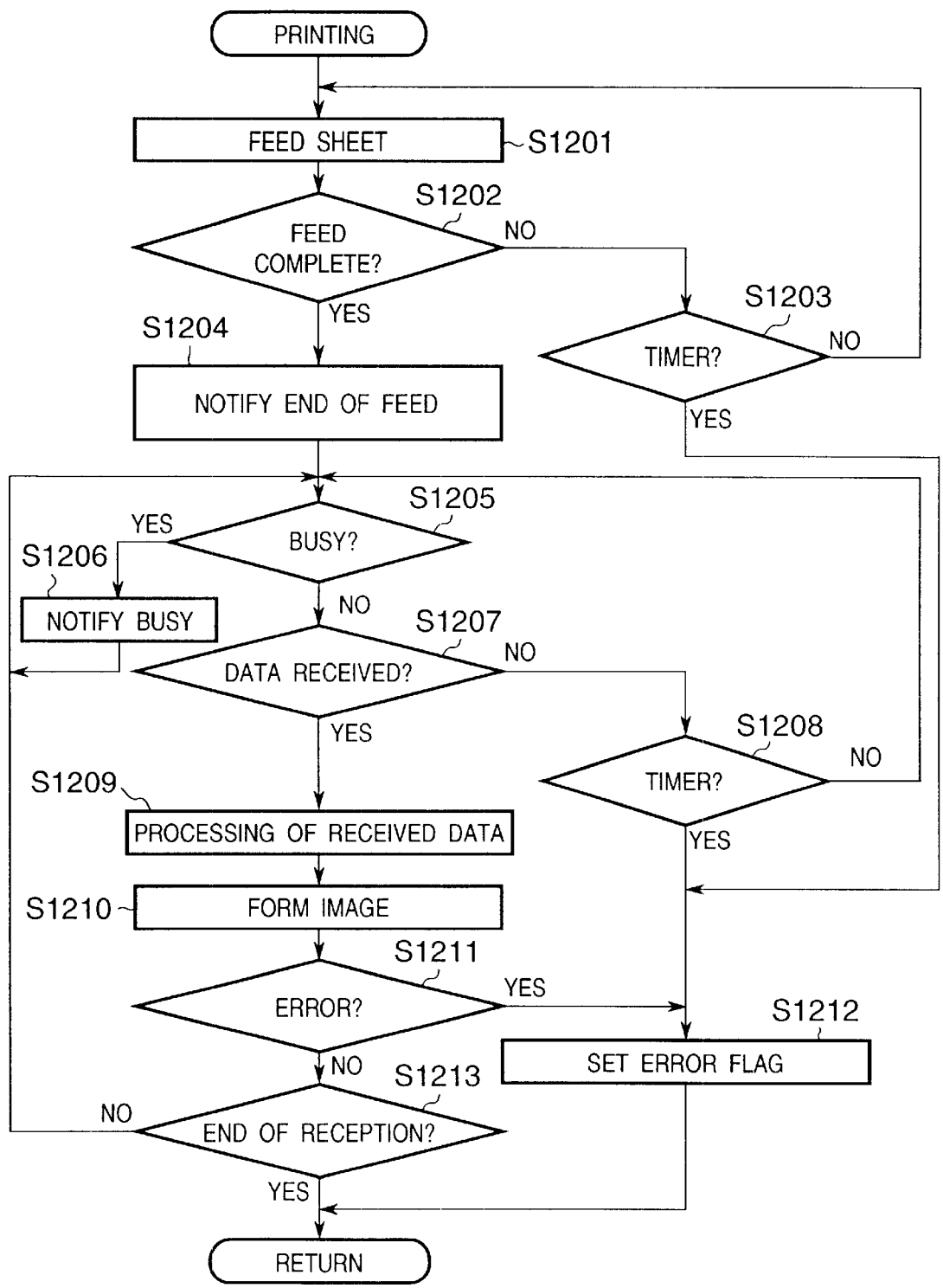
FIG. 16 is a flow chart showing the printing routine of the printing device.

FIG. 16 is a flow chart showing details of printing processing in S1109 of FIG. 15.

To sequentially convey a print sheet to the transfer units 33, 34, 35, and 36 of the printing device 103, the controller 401 executes feed processing of picking up a print sheet from the sheet cassette 41 or 42 and feeding the print sheet (S1201).

The leading end of the fed print sheet is aligned by a register roller arranged before the first transfer unit 33. At this time, a sheet sensor senses the end of feed, and notifies the controller 401 of this.

If the end of feed is sensed (YES in S1202) within a predetermined time (S1203), the controller 401 notifies the computer 101 of the end of feed via the high-speed serial communication I/F cables 105 and 106 using the Async transfer mode (S1204). If the end of feed is not sensed (NO in S1202) within a predetermined time (YES in S1203), the controller 401 sets an error flag (S1212) to complete printing processing routine S1109.

If the controller 401 is busy and cannot receive data (YES in S1205), the controller 401 notifies the computer 101 using the Async transfer mode of the busy status (S1206), and returns to S1205.

If the computer 101 starts transmitting image data in the Iso transfer mode within a predetermined time (S1208) (YES in S1207), the high-speed serial communication unit 408 starts receiving the image data.

The controller 401 receives the image data from the computer 101 via the high-speed serial communication I/F cables 105 and 106, high-speed serial communication connector 409, and high-speed serial communication unit 408 using one or a plurality of allocated channels in order to perform data transfer for which a data transfer period is guaranteed.

If the controller 401 receives image data through one or a plurality of channels in the Iso transfer mode (YES in S1207), the controller 401 transmits the received image data from the high-speed serial communication unit 408 to the image processing units 431, 432, 433, and 434 where the transmitted image data undergo predetermined image processing (S1209). The processed image data is formed into an image by the printing units 441, 442, 443, and 444 (S1210).

If any error such as jam occurs in forming the image (YES in S1211), the controller 401 sets an error flag (S1212) to complete printing processing routine S1109.

If image data is subsequently received (S1213), the controller 401 returns to S1205 to repeat a series of processes.

If image data has been received (YES in S1213), the controller 401 completes printing processing routine S1109.

Other Embodiments

In the above embodiment, the computer 101, scanning device 102, and printing device 103 are respectively connected to the high-speed serial communication I/F cables 104, 105, 106, and 107. Alternatively, a combination of one or a plurality of computers, scanning devices, and printing devices may be connected.

Devices connected to the high-speed serial communication I/F cables 104, 105, 106, and 107 are not limited to the computer 101, scanning device 102, and printing device 103. One or a plurality of other devices such as a digital video player, digital camera, and FAX may be connected.

Also in this case, high-speed serial communication channels can be dynamically redistributed between connected devices by the same procedures as those of the above embodiment.

In the above embodiment, image data is transferred from the scanning device 102 to the computer 101. Instead, image data may be temporarily transferred from the scanning device to a server and then transferred from the server to the computer.

It is also possible to transfer a command instructing image scanning from the computer to the server, and transfer image data from the scanning device to the server.

In these cases, a series of processes performed between the scanning device and computer that are described in the embodiment of the present invention are executed between the scanning device and server.

In the above embodiment, image data is transferred from the computer 101 to the printing device 103. Alternatively, image data may be temporarily transferred from the computer to the server and then from the server to the printing device.

It is also possible to transfer a command instructing image formation from the computer to the server, and transfer image data from the server to the printing device.

In these cases, a series of processes performed between the computer and printing device that are described in the embodiment of the present invention are executed between the server and printing device.

Moreover, image data may be directly transferred from the scanning device to the printing device. For example, when a plurality of combinations of scanning devices and printing devices are connected to high-speed serial communication I/Fs, high-speed serial communication channels are dynamically redistributed for each combination.

Even if a computer and other devices are connected to a combination of the scanning device and printing device, high-speed serial communication channels are similarly dynamically redistributed.

The present invention is applied to a system constituted by a plurality of devices (e.g., a host computer, interface device, reader, and printer) in the above embodiment, but may be applied to the internal bus of an apparatus comprising a single device (e.g., a copying machine or facsimile apparatus).

The object of the present invention is realized even by supplying a storage medium storing software program codes for realizing the functions of the above embodiment to a system or apparatus, and causing the computer (or a CPU or MPU) of the system or apparatus to read out and execute the program codes stored in the storage medium.

In this case, the program codes read out from the storage medium realize the functions of the above embodiment by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above embodiment are realized not only when the readout program codes are executed by the computer but also when the OS (Operating System) running on the computer performs part or all of actual processing on the basis of the instructions of the program codes.

The functions of the above embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention can provide an information processing system capable of flexibly assigning channels in an isochronous transfer serial bus to transfer information desired by the user, a control method for the information processing system, and an information processing apparatus.

As many apparently widely different embodiments of the present invention can be made without departing from the spirit and scope thereof, it is to be understood that the invention is not limited to the specific embodiments thereof except as defined in the appended claims.

What is claimed is:

1. An information processing system comprising:
an isochronous transfer serial bus capable of transmitting a plurality of types of packets discriminated by channels; and
at least two information processing apparatuses each of which uses said isochronous transfer serial bus as a communication interface and can receive packets of channels assigned thereto,
wherein either one of said information processing apparatuses has channel management means capable of modifying allocation of the channels in accordance with predetermined priority,
wherein the channel management means comprises:
search means for searching for an available channel in order to allocate the number of channels necessary for a first information processing apparatus of the information processing apparatuses;
determination means for determining whether or not any of channels allocated to a second information processing apparatus can be assigned to the first information processing apparatus when no available channel is searched by the search means; and
channel reallocation means for reassigning at least some of the channels to the first information processing apparatus, wherein the channels are determined to be assignable by the determination means.

2. The system according to claim 1, wherein when said information processing apparatus which has been allocated channels has low priority, said channel management means assigns the channels allocated by said information processing apparatus to an other information processing apparatus having high priority.

3. The system according to claim 1, wherein said channel management means stores channel information assigned to each of said information processing apparatuses.

4. The system according to claim 1, wherein the priority is determined by inputting an operation mode corresponding to which of said information processing apparatuses has operation priority.

5. The system according to claim 1, wherein said information processing apparatuses include a scanning apparatus and/or printing apparatus.

6. The system according to claim 1, wherein said channel management means modifies allocation of the channels in accordance with an inquiry from at least one of said information processing apparatuses.

7. An information processing apparatuses which uses, as a communication interface with another apparatus, an isochronous transfer serial bus capable of transmitting a plurality of types of packets discriminated by channels, and can receive packets of channels assigned thereto, comprising:
channel management means capable of modifying allocation of the channels in accordance with predetermined priority,
wherein the channel management means comprises:
search means for searching for an available channel in order to allocate the number of channels necessary for a first information processing apparatus of the information processing apparatuses;
determination means for determining whether or not any of channels allocated by a second information processing apparatus can be assigned to the first information processing apparatus when no available channel is searched by the search means; and
channel reallocation means for reassigning at least some of the channels allocated by the second information processing apparatus to the first information processing apparatus when channels assignable to the first information processing apparatus are determined by the determination means to exist in the channels allocated by the second information processing apparatus.

8. A control method for an information processing system having
an isochronous transfer serial bus capable of transmitting a plurality of types of packets discriminated by channels, and
at least two information processing apparatuses each of which uses the isochronous transfer serial bus as a communication interface and can receive packets of channels assigned thereto, comprising:
a channel management step for modifying allocation of the channels in accordance with predetermined priority; and
a communication step for performing communication in accordance with allocation of the channels modified in the channel management step,
wherein the channel management step comprises:
a search step for searching for an available channel in order to allocate the number of channels necessary for a first information processing apparatus of the information processing apparatuses;
a determination step for determining whether or not any of channels allocated to a second information processing apparatus can be assigned to the first information processing apparatus when no available channel is searched in the search step; and
a channel reallocation step for reassigning at least some of the channels allocated to the second information processing apparatus to the first information processing apparatus when channels assignable to the first information processing apparatus are determined in the determination step to exist in the channels allocated by the second information processing apparatus.

9. The method according to claim 8, wherein the channel management step comprises modifying allocation of the channels in accordance with an inquiry from at least one of the information processing apparatuses.

10. A computer readable memory which stores a control program for an information processing system having
an isochronous transfer serial bus capable of transmitting a plurality of types of packets discriminated by channels, and
at least two information processing apparatuses each of which uses the isochronous transfer serial bus as a communication interface and can receive packets of channels assigned thereto, storing:
a code of the channel management program for modifying allocation of the channels in accordance with predetermined priority; and
a code of the communication program for performing communication in accordance with allocation of the channels modified by the channel management program,
wherein the channel management program comprises:
the search program for searching for an available channel in order to allocate the number of channels necessary for a first information processing apparatus of the information processing apparatuses;
the determination program for determining whether any of channels allocated to a second information processing apparatus can be assigned to the first information processing apparatus when no available channel is searched by the search program; and the channel reallocation program for reassigning at least some of the channels allocated to the second information processing apparatus to the first information processing apparatus when channels assignable to the first information processing apparatus are determined by the determination program to exist in the channels allocated to the second information processing apparatus.

11. A communication apparatus comprising:

a first determination unit for determining whether or not there are a necessary number of available channels from among a plurality of channels;

a second determination unit for determining whether or not any of channels allocated to another device can be redistributed, when the first determination unit determines that there are not the necessary number of available channels; and a channel reallocation unit for reallocating at least some of the channels when the second determination unit determines that the channels can be redistributed.

12. The apparatus according to claim 11, further comprising:

a third determination unit for determining whether or not it is necessary to request redistribution of the channels from the another device; and a request unit for requesting the redistribution of channels to the another device when the third determination unit determines that it is necessary to request the redistribution of the channels.

13. A communication method comprising:

a first determination step of determining whether or not there are a necessary number of available channels from among a plurality of channels;

a second determination step of determining whether or not any of channels allocated to another device can be redistributed, when it is determined in the first determination step that there are not the necessary number of available channels; and a channel reallocation step of reallocating at least some of the channels when it is determined in the second determination step that the channels can be redistributed.

14. The method according to claim 13, further comprising:

a third determination step of determining whether or not it is necessary to request redistribution of the channels from the another device; and a request step of requesting the redistribution of channels to the another device when it is determined in the third determination unit that it is necessary to request the redistribution of the channels.

* * * * *